US010472549B2

(12) United States Patent
Ringold et al.

(10) Patent No.: US 10,472,549 B2
(45) Date of Patent: Nov. 12, 2019

(54) CREPING ADHESIVES CONTAINING FUNCTIONALIZED CROSSLINKED RESINS

(71) Applicant: ECOLAB USA INC., St. Paul, MN (US)

(72) Inventors: Clay E. Ringold, Decatur, GA (US); Cornel Hagiopol, Lilburn, GA (US)

(73) Assignee: ECOLAB USA INC., St. Paul, MN (US)

( * ) Notice: Subject to any disclaimer, the term of this patent is extended or adjusted under 35 U.S.C. 154(b) by 9 days.

(21) Appl. No.: 15/738,893

(22) PCT Filed: Jun. 23, 2016

(86) PCT No.: PCT/US2016/038920
§ 371 (c)(1),
(2) Date: Dec. 21, 2017

(87) PCT Pub. No.: WO2016/210066
PCT Pub. Date: Dec. 29, 2016

(65) Prior Publication Data
US 2018/0179427 A1 Jun. 28, 2018

Related U.S. Application Data

(60) Provisional application No. 62/184,452, filed on Jun. 25, 2015, provisional application No. 62/241,453, filed on Oct. 14, 2015.

(51) Int. Cl.
C09J 179/02 (2006.01)
C08G 73/02 (2006.01)

(52) U.S. Cl.
CPC .......... C09J 179/02 (2013.01); C08G 73/028 (2013.01); C08G 73/0286 (2013.01); C08G 73/0293 (2013.01)

(58) Field of Classification Search
CPC .. C09J 179/02; C08G 73/028; C08G 73/0286; C08G 73/0293
See application file for complete search history.

(56) References Cited

U.S. PATENT DOCUMENTS

| 4,390,689 | A | | 6/1983 | Jacquet et al. | |
|---|---|---|---|---|---|
| 5,382,323 | A | * | 1/1995 | Furman, Jr. .......... | C08G 73/028 162/111 |
| 5,786,429 | A | * | 7/1998 | Allen ................ | C08G 69/48 525/430 |
| 6,017,418 | A | | 1/2000 | Oriaran et al. | |
| 9,045,862 | B2 | * | 6/2015 | Ringold ............ | D21H 21/20 162/164.6 |
| 2008/0255320 | A1 | * | 10/2008 | Allen ................ | C08G 73/0286 525/430 |
| 2008/0257507 | A1 | * | 10/2008 | Campbell ........... | B31F 1/12 162/111 |
| 2014/0020858 | A1 | * | 1/2014 | Ringold ............ | D21G 21/20 162/164.6 |
| 2014/0166223 | A1 | | 6/2014 | Hagiopol et al. | |
| 2015/0108070 | A1 | * | 4/2015 | Kim ................ | C02F 1/683 210/688 |

FOREIGN PATENT DOCUMENTS

| EP | 0814108 | 12/1997 |
|---|---|---|
| EP | 0732352 | 12/2001 |
| WO | 2014/015121 | 1/2014 |

OTHER PUBLICATIONS

International Search Report for PCT/US2016/038920, dated Dec. 7, 2016.
Extended European Search Report for European application No. 16815264.3, dated Feb. 14, 2019.

* cited by examiner

Primary Examiner — Nicholas E Hill
(74) Attorney, Agent, or Firm — Edmonds & Cmaidalka, P.C.

(57) ABSTRACT

Creping adhesives can include one or more crosslinked resins having the chemical formula (O), (P), or (Q), where $R^X$ can be a crosslinking moiety, each $R^Y$ can independently be a substituted or unsubstituted organic diyl moiety, and each $A^-$ can independently be an anion. The creping adhesive can have a cylinder probe adhesion of about 100 gram-force to about 300 gram-force. The creping adhesive can have a peel adhesion of about 20 g/cm to about 110 g/cm.

20 Claims, No Drawings

CREPING ADHESIVES CONTAINING FUNCTIONALIZED CROSSLINKED RESINS

CROSS-REFERENCE TO RELATED APPLICATIONS

This application claims priority to U.S. Provisional Patent Application No. 62/184,452, filed on Jun. 25, 2015, and to U.S. Provisional Patent Application No. 62/241,453, filed on Oct. 14, 2015, which are both incorporated by reference herein.

BACKGROUND

Field

Embodiments described generally relate to creping adhesives. More particularly, such embodiments relate to creping adhesives that include functionalized crosslinked resins and methods for making and using same.

Description of the Related Art

Paper tissue and towel products, such as facial tissue, bathroom tissue, and napkins, should have a degree of perceived softness for consumer acceptance of such products. The most common method of increasing the perceived softness of tissue and towel products is to crepe the paper, which includes mechanically compacting the paper in the machine direction. The creping imparts a fine, rippled texture to the paper and also increases the bulk of the paper, resulting in improved softness and absorbency, as well as other significant changes in many physical properties such as stretch, particularly when measured in the machine direction. Creping is generally accomplished by adhering a cellulosic paper web to a thermal drum dryer, generally called a Yankee dryer. The web can be applied onto the surface of the Yankee dryer which has generally been sprayed with a mixture of an adhesive and a release agent, usually in the form of an aqueous solution, emulsion, or dispersion. The applied web is scraped backwardly upon itself and off of the Yankee dryer by a flexible blade, known as a creping blade or a doctor blade.

Some adhesive build-up on the Yankee dryer surface is needed to control the creping process; however, excessive build-up of adhesive, such as streaks of adhesive on the dryer surface, can interfere with the creping process. The proper level of adhesion between the paper web and the Yankee dryer must be obtained and maintained for creping the paper product to a desired perceived softness. Also, the level of adhesion between the paper web and the Yankee dryer impacts the efficiency at which the web is dried. Higher levels of adhesion reduce the impedance of heat transfer and cause the web to dry faster, enabling more energy efficient, higher speed operation, while poor adhesion interferes with the high processing speeds needed in current papermaking operations.

Typical creping adhesives that are used on the Yankee dryer have a relatively low water solubility or can be completely water insoluble so that they are not readily removed from the Yankee dryer surface when exposed to water used in the process.

There is a need, therefore, for an improved creping adhesives and methods for making and using same.

SUMMARY

Creping adhesives that include functionalized crosslinked resins and methods for making and using same are provided.

In at least one example, the creping adhesive can include one or more crosslinked resins having the chemical formula:

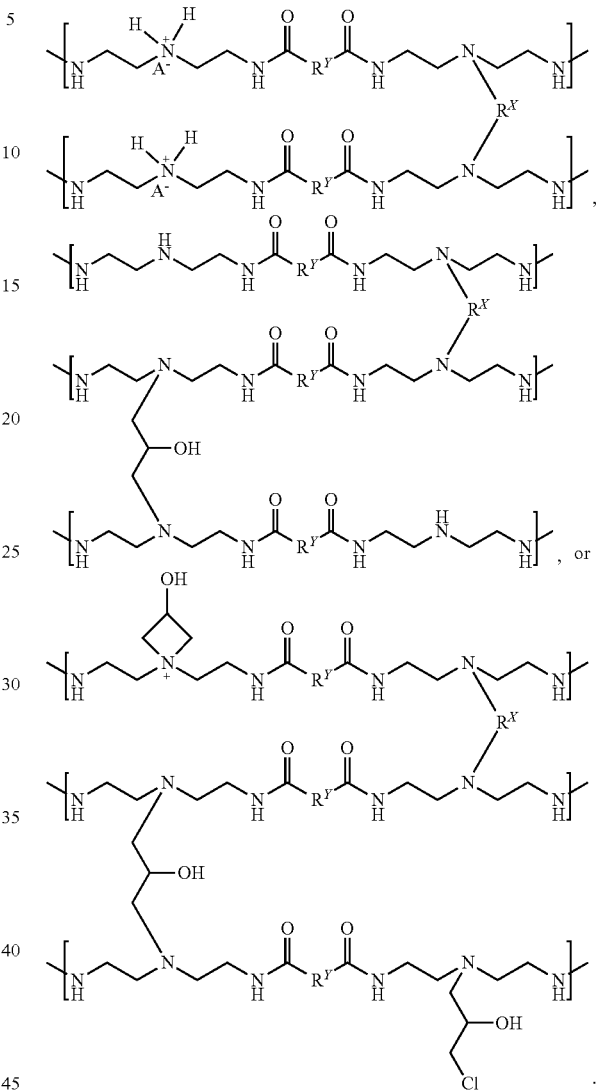

$R^X$ can be a crosslinking moiety. Each $R^Y$ can independently be a substituted or unsubstituted organic diyl moiety. Each $A^-$ can independently be an anion.

In other examples, the creping adhesive can include a functionalized crosslinked resin that can have azetidinium moieties and pendent halohydrin moieties disposed on polyamidoamine backbones. The polyamidoamine backbones can be crosslinked by primary crosslinking moieties and propanediyl crosslinking moieties. The primary crosslinking moieties can be derived from a functionally-symmetric crosslinker.

In other examples, the creping adhesive can include a functionalized crosslinked resin that can have azetidinium moieties and pendent halohydrin moieties disposed on polyamidoamine backbones. The polyamidoamine backbones can be crosslinked by primary crosslinking moieties and propanediyl crosslinking moieties. The primary crosslinking moieties can be derived from a functionally-symmetric crosslinker comprising a diacrylate compound, a bis(acrylamide) compound, a bis(methacrylamide) compound, a diepoxide compound, a polyazetidinium compound, a diisocyanate compound, a 1,3-dialkyldiazetidine-2,4-dione compound, a dianhydride compound, a diacyl halide compound, a dienone compound, a dialkyl halide compound, a dialdehyde compound, or any mixture thereof. The propanediyl crosslinking moieties can be derived from epichlorohydrin, epibromohydrin, epiiodohydrin, or any mixture thereof. The creping adhesive can have a cylinder probe adhesion of about 100 gram-force to about 300 gram-force. The creping adhesive can have a peel adhesion of about 20 g/cm to about 110 g/cm. The creping adhesive at 15 wt % solids can have a viscosity of about 10 cP to about 300 cP at a temperature of about 25° C.

DETAILED DESCRIPTION

One or more polyamidoamines and one or more functionally-symmetric crosslinkers can be reacted to produce a partially crosslinked resin that can have secondary amines disposed on polyamidoamine backbones that are crosslinked by primary crosslinking moieties derived from the one or more functionally-symmetric crosslinkers. In some examples, the partially crosslinked resin and a first epihalohydrin can be reacted to produce a crosslinked resin that can have the polyamidoamine backbones that are cross-linked by the primary crosslinking moieties and crosslinked by propanediyl crosslinking moieties derived from the first epihalohydrin. In some examples, the crosslinked resin and a second epihalohydrin can be reacted to produce a functionalized crosslinked resin that can have azetidinium moieties and pendent halohydrin moieties disposed on the polyamidoamine backbones that are crosslinked by the primary crosslinking moieties and the propanediyl crosslinking moieties.

In some examples, the partially crosslinked resin and the first epihalohydrin can be combined to produce a first mixture. The first epihalohydrin can be combined with the crosslinked resin in an amount of about 0.005 mol to about 0.5 mol per mole of the secondary amines. The first mixture can be heated to a first temperature, e.g., a temperature of greater than 30° C. to about 100° C. or about 20° C. to about 90° C., to produce the crosslinked resin. The crosslinked resin can be cooled to a second temperature that can be less than the first temperature, such as at a temperature of about 0° C. to less than 30° C. (when the first temperature is greater than or equal to 30° C.) or about 20° C. to about 70° C. The second epihalohydrin and the crosslinked resin can be combined at the second temperature to produce the functionalized crosslinked resin. The second epihalohydrin can be combined with the crosslinked resin in an amount of about 0.005 mol to about 0.4 mol per mole of the secondary amines. The functionalized crosslinked resin can have an azetidinium ratio of about 0.005 to about 0.12 and a pendent halohydrin ratio of about 0.01 to about 0.15. The functionalized crosslinked resin can also have a pendent halohydrin to azetidinium ratio of about 3:1 to about 10:1.

The creping adhesives can be or include one or more functionalized crosslinked resins that can have one or more advantages over conventional resins used in creping adhesives. For example, the functionalized crosslinked resins can have increased reactive functionality due to the amount of azetidinium ions and the amount of halohydrin groups disposed on the polyamidoamine backbones. The functionalized crosslinked resins can also have an increased controllability of the amount of crosslinking that can be incorporated between the polyamidoamine backbones. As such, the functionalized crosslinked resins can also have an increased molecular weight relative to the conventional creping resins. The functionalized crosslinked resins can have a relatively low or controllable water solubility and relatively high solids content compared to the conventional creping resins. The functionalized crosslinked resins can also have a relatively low concentration of epichlorohydrin by-products, such as 1,3-dichloro-2-propanol (1,3-DCP or "DCP") or 3-chloropropane-1,2-diol (3-CPD or "CPD"). For example, the functionalized crosslinked resins can include less than 15,000 ppm or less than 5,000 ppm of each DCP and/or CPD.

The synthesis of the functionalized crosslinked resin can include two or three generally separate and controllable reactions or steps. In some examples, the first reaction or step can include reacting one or more prepolymers (e.g., one or more polyamines and/or one or more polyamidoamines) with one or more functionally-symmetric crosslinkers to produce the partially crosslinked resin. Each functionally symmetric crosslinker can utilize two moieties for reacting with and crosslinking to two polyamines or polyamidoamines to produce the partially crosslinked resin. Each moiety of the functionally symmetric crosslinker can react with a secondary amine group of the respective polyamine or polyamidoamine to effect crosslinking therebetween and form the partially crosslinked resin. The second reaction or step can impart additional crosslinking of the partially crosslinked resin via one or more epihalohydrins or "first epihalohydrins" to produce the crosslinked resin. A substoichiometric amount of the epihalohydrin, for example, about 0.5 mol of the epihalohydrin per mole of the secondary amines, can be combined with the partially crosslinked resin to produce the crosslinked resin. The third reaction or step can impart reactive functionality, including azetidinium moieties and pendent halohydrin moieties, to the crosslinked resin via the addition of one or more epihalohydrins or "second epihalohydrins" to produce the functionalized crosslinked resin. The first epihalohydrin and the second epihalohydrin can be the same epihalohydrin, e.g., epichlorohydrin, or the first epihalohydrin and the second epihalohydrin can be different epihalohydrins with respect to one another. A substoichiometric amount of the second epihalohydrin, for example, about 0.4 mol or less of the second epihalohydrin per mole of the secondary amines, can be combined with the crosslinked resin to produce the functionalized crosslinked resin. In another example, the first reaction or step described above can be the same, but the second and third steps can be combined to make the functionally-symmetric crosslinker.

Polyamine and Polyamidoamine Prepolymers

One or more polyamine prepolymers can be used to make or otherwise produce adhesives that can include the crosslinked resins and the functionalized crosslinked resins. The polyamine prepolymers can be or include one or more polyamines, and the polyamines and can be or include one or more polyamidoamines. The polyamine prepolymers can include primary and/or secondary amine moieties. By way of example, the polyamine, which can be referred to herein as a polyamine prepolymer, can have the chemical formula (A):

(A), where R can be a substituted or unsubstituted organic diyl moiety and w can be an integer of 1 to about 10,000. In some examples, w can be 1 to about 5,000, 1 to about 3,000, 1 to about 1,000, 1 to about 100, or 1 to about 10. The organic diyl moiety R can be or include substituted or unsubstituted groups, linear or branched groups, acyclic or cyclic groups, and/or monomeric or polymeric units. The organic diyl moiety R can be or include one or more alkyls, hydroxyalkyls, amines, amides, aryls, heteroaryls, cycloalkyls, or derivatives thereof. A hydroxyalkyl group can include one or more hydroxyl (OH) moieties substituted on an alkyl moiety.

In some examples, the organic diyl moiety R of the polyamine prepolymer (A) can be or include an alkyl moiety that can be linear or branched. The organic diyl moiety R can also be a cycloalkyl, for example, a cyclic hydrocarbon moiety having from 1 to about 25 carbon atoms. For example, the organic diyl moiety R can have from 1 to 25, from 1 to 20, from 1 to 15, from 1 to 12, from 1 to 10, from 1 to 8, from 1 to 6, or from 1 to 4 carbon atoms. Also, the organic diyl moiety R can have from 2 to 10, 2 to 8, 2 to 6, or 2 to 4 carbon atoms. In some examples, R can be a $C_1$ moiety, a $C_2$ moiety, a $C_3$ moiety, a $C_4$ moiety, a $C_5$ moiety, a $C_6$ moiety, a $C_7$ moiety, a $C_8$ moiety, a $C_9$ moiety, a $C_{10}$ moiety, a $C_{11}$ moiety, a $C_{12}$ moiety, a $C_{13}$ moiety, a $C_{14}$ moiety, a $C_{15}$ moiety, a $C_{16}$ moiety, a $C_{17}$ moiety, a $C_{18}$ moiety, a $C_{19}$ moiety, a $C_{20}$ moiety, a $C_{21}$ moiety, a $C_{22}$ moiety, a $C_{23}$ moiety, a $C_{24}$ moiety, a $C_{25}$ moiety, a $C_{26}$ moiety, a $C_{27}$ moiety, a $C_{28}$ moiety, a $C_{29}$ moiety, a $C_{30}$ moiety.

In the polyamine prepolymer (A), the organic diyl moiety R can be a poly-primary amine, such as a polyvinyl amine or a polyvinyl amine copolymer. Examples of a poly-primary amine that can include the organic diyl moiety R in the polyamine prepolymer (A) can include, but are not limited to, one or more amines having the moiety $—[CH_2CH(NH_2)]_n—$, as well as copolymers with olefins and other unsaturated moieties, where n can be an integer of 1 to about 25. For example, n can be an integer of 1 to about 20; 1 to about 15; 1 to about 12; 1 to about 10; or 1 to about 5. In some examples, n can be 1, 2, 3, 4, 5, 6, 7, 8, 9, 10, 11, 12, 13, 14, 15, 16, 17, 18, 19, 20, 21, 22, 23, 24, or 25.

Suitable polyamines (polyamine prepolymers) for use in preparing the crosslinked resins can include, but are not limited to, polyalkylene polyamines, such as polyethylene-polyamines including diethylenetriamine (DETA), triethylenetetramine (TETA), aminoethyl piperazine, tetraethylenepentamine, pentaethylenehexamine, N-(2-aminoethyl)piperazine, N,N'-bis(2-aminoethyl)-ethylenediamine, diaminoethyl triaminoethylamine, piperazinethyl triethylenetetramine, or any mixture thereof. Also useful in preparing polyamine prepolymers for use in preparing the crosslinked resins can include, but are not limited to, ethylene diamine, low molecular weight polyamidoamines, polyvinylamines, polyethyleneimine (PEI), copolymers of vinyl amine with other unsaturated copolymerizable monomers such as vinyl acetate and vinyl alcohol, or any mixture thereof.

In some examples, the polyamine prepolymer (A), can have a weight average molecular weight ($M_w$) of about 2,000 to about 1,000,000. For example, the $M_w$ of the polyamine prepolymer (A) can be about 5,000 to about 750,000; about 7,500 to about 500,000; about 10,000 to about 200,000; about 20,000 to about 150,000; about 30,000 to about 100,000; or about 25,000 to about 50,000. The $M_w$ is the arithmetic mean or average of the molecular masses or weights of the individual macromolecules of the polymer or resin and takes into account the molecular mass or weight of a chain in determining contributions to the molecular weight average. The $M_w$ can be measured using gel permeation chromatography ("GPC"), also known as size exclusion chromatography ("SEC"). This technique utilized an instrument containing columns packed with porous beads, an elution solvent, and detector in order to separate polymer molecules of different sizes.

In some examples, one or more polyamidoamine prepolymers can also be used to make or otherwise produce adhesives that can include the crosslinked resins and the functionalized crosslinked resins. The polyamidoamine prepolymers can be made by the reaction of one or more polyalkylene polyamines having at least two primary amine groups and at least one secondary amine group with a dicarboxylic acid, in a process to form a long chain polyamide containing the recurring groups. In some examples, the polyamidoamine prepolymer can have the following chemical formula (B):

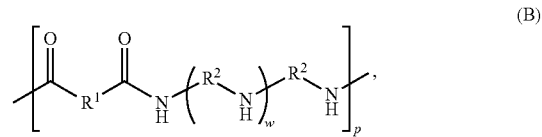

where $R^1$ can be $(CH_2)_m$, where m can be 1, 2, 3, 4, or 5; each $R^2$ can independently be $(CH_2)_n$, where n can be 2, 3, or 4; w can be 1, 2, or 3; and p can be an integer of 1 to about 10,000. In some examples, the polyamidoamine prepolymer (B) can have a $M_w$ of about 2,000 to about 1,000,000. For example, the $M_w$ of the polyamidoamine prepolymer can be about 5,000 to about 100,000; about 7,500 to about 80,000; about 10,000 to about 60,000; about 20,000 to about 55,000; about 25,000 to about 50,000; or about 30,000 to about 50,000.

In some examples, each $R^1$ and $R^2$ can independently be a substituted or unsubstituted organic diyl moiety and each organic diyl moiety can independently be a $C_1$-$C_5$ diyl moiety. For example, each organic diyl moiety can independently be methanediyl ($—CH_2—$), ethanediyl ($—CH_2CH_2—$), propanediyl ($—CH_2CH_2CH_2—$), butanediyl ($—CH_2(CH_2)_2CH_2—$), pentanediyl ($—CH_2(CH_2)_3CH_2—$), isomers thereof, halide-substituted derivatives thereof, or alkyl-substituted derivatives thereof.

The polyamidoamine prepolymer can have the following chemical formula (C):

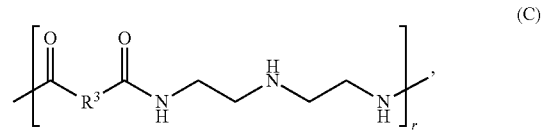

where $R^3$ can be $(CH_2)_q$, where q can be 1 to about 40; and r can be an integer of 1 to about 10,000. In some examples of the polyamidoamine prepolymer (C), $R^3$ can be $(CH_2)_q$, where q can be 1 to about 40, 1 to about 35, 1 to about 30, 1 to about 25, 1 to about 20, 1 to about 15, 1 to about 12, 1 to about 10, 1 to about 8, or 1 to about 6. In other examples, $R^3$ can be a substituted or unsubstituted organic diyl moiety. The diyl moiety $R^3$ can be a $C_1$-$C_5$ diyl moiety. For example, the diyl moiety $R^3$ can be methanediyl ($—CH_2—$), ethanediyl ($—CH_2CH_2—$), propanediyl ($—CH_2CH_2CH_2—$), butanediyl ($—CH_2(CH_2)_2CH_2—$), pentanediyl ($—CH_2(CH_2)_3CH_2—$), isomers thereof, halide-substituted derivatives thereof, or alkyl-substituted derivatives thereof.

In some examples, the polyamidoamine prepolymer (C) can have a $M_w$ of about 2,000 to about 1,000,000. For example, the polyamidoamine prepolymer can have a $M_w$ of about 2,000, about 5,000, about 10,000, about 15,000, about 20,000, about 25,000, or about 30,000 to about 32,000, about 35,000, about 40,000, about 45,000, about 50,000, about 55,000, about 60,000, about 80,000, about 100,000, about 150,000, about 200,000, about 250,000, or greater. In other examples, the polyamidoamine prepolymer (C) can have a $M_w$ of about 5,000 to about 100,000; about 7,500 to about 80,000; about 10,000 to about 60,000; about 20,000 to about 55,000; about 25,000 to about 50,000; about 30,000 to about 50,000; about 35,000 to about 50,000; or about 40,000 to about 50,000.

In other examples, the polyamidoamine prepolymer can have the chemical formula (D):

-[—NH($C_nH_{2n}$—NH)$_p$—CO—($CH_2$)$_m$—CO—]-     (D), where n can be 1 to 8; p can be 2 to 5; and m can be 1 to about 40. The $M_w$ of the polyamidoamine prepolymer (D) can be the same or similar to the weight average molecular weights of the compounds having chemical formulas (B) and (C). For example, the $M_w$ of the polyamidoamine prepolymer (D) can be about 2,000 to about 1,000,000. In another example, the $M_w$ can be about 5,000 to about 100,000; about 7,500 to about 80,000; about 10,000 to about 60,000; about 20,000 to about 55,000; about 25,000 to about 50,000; or about 30,000 to about 50,000.

Suitable polyamidoamines can be prepared by reacting one or more dicarboxylic acids (diacids), or a corresponding dicarboxylic acid halide or diester thereof, with one or more polyamines such as a polyalkylene polyamine. Suitable polyamines include those polyamines (polyamine prepolymers) discussed and described herein that can be used as precursors for the crosslinked resin. For example, the polyamidoamine can be made by reacting one or more polyalkylene polyamines, such as polyethylenepolyamines including ethylenediamine, DETA, TETA, aminoethyl piperazine, tetraethylenepentamine, pentaethylenehexamine, N-(2-aminoethyl)piperazine, N,N'-bis(2-aminoethyl)-ethylenediamine, diaminoethyl triaminoethylamine, piperazinethyl triethylenetetramine, or derivatives thereof, with one or more polycarboxylic acids, such as succinic acid, glutaric acid, 2-methylsuccinic acid, adipic acid, pimelic acid, suberic acid, azelaic acid, sebacic acid, undecanedioic acid, dodecandioic acid, 2-methylglutaric acid, 3,3-dimethylglutaric acid, tricarboxypentanes, e.g., 4-carboxypimelic, alicyclic saturated acids, e.g., 1,2-cyclohexanedicarboxylic, 1-3-cyclohexanedicarboxylic, 1,4-cyclohexanedicarboxylic, and 1-3-cyclopentanedicarboxylic, unsaturated aliphatic acids, e.g., maleic acid, fumaric acid, itaconic acid, citraconic acid, mesaconic acid, aconitic acid, and hexane-3-diotic acid; unsaturated alicyclic acids, e.g., 1,4-cyclohexenedicarboxylic; aromatic acids, e.g., phthalic acid, isophtalic acid, terephthalic acid, 2,3-naphthalenedicarboxylic acid, and benzene-1,4-diacetic acid; and heteroaliphatic acids, e.g., diglycolic acid, thiodiglycolic acid, dithiodiglycolic acid, iminodiacetic acid, and methyliminodiacetic acid; salts thereof; esters thereof; hydrates thereof; isomers thereof; or any mixture thereof.

One or more diacids, one or more diesters, salts thereof, hydrates thereof, or any mixture thereof can be reacted with one or more polyamines to produce polyamidoamines. Illustrative diacids and/or diesters can include, but are not limited to, diacids and/or diesters of the formula $RO_2C(CH_2)_nCO_2R'$, where n can be 1 to 10 and R and R' can independently be H, methyl, or ethyl. In some examples, adipic acid can be used to make or otherwise prepare one or more polyamidoamines. In other examples, R can be methyl and the dibasic ester can be or include one or more compounds that have the chemical formula $CH_3O_2C(CH_2)_nCO_2CH_3$, where n can be 1, 2, 3, 4, or 5. For example, the dibasic ester can be or include dibasic ester-2 (also known as DBE-2), where n can be 3 and/or 4, such as dimethyl glutarate, dimethyl adipate, or a mixture of dimethyl glutarate and dimethyl adipate. In some examples, the dibasic ester can be or include dibasic ester-9 (also known as DBE-9), where n can be 2 and/or 3, such as dimethyl glutarate, dimethyl succinate, or a mixture of dimethyl glutarate and dimethyl succinate. In other examples, the dibasic ester can be or include dibasic ester-4 (also known as DBE-4), where n can be 2, such as dimethyl succinate. In other examples, the dibasic ester can be or include dibasic ester-5 (also known as DBE-5), where n can be 3, such as dimethyl glutarate. In other examples, the dibasic ester can be or include dibasic ester-6 (also known as DBE-6), where n can be 4, such as dimethyl adipate. Illustrative dibasic esters can be or include, but are not limited to, one or more of dimethyl glutarate, dimethyl adipate, dimethyl succinate, or any mixture thereof.

Functionally-Symmetric Crosslinker

The secondary amines of the polyamine prepolymers can be reacted with the one or more functionally-symmetric crosslinkers to produce the partially crosslinked resin that can have crosslinking to the polyamine or polyamidoamine backbones of the polyamine prepolymers via primary crosslinking moieties derived from the functionally-symmetric crosslinker. This reaction can provide for a greater degree of control over the crosslinking process. This reaction can also provide a crosslinked resin with a greater molecular weight than the starting polyamine prepolymer. The viscosity endpoint and thus the molecular weight of the partially crosslinked resin can be pre-determined and controlled simply by the amount of functionally-symmetric crosslinker employed. The crosslinking reaction can proceed to an end-point as the crosslinker can be consumed and stop when consumption of crosslinker is complete. A decreased and measurable amount of secondary amine functionality can remain available for further functionalization.

In this crosslinking step, the polyamine prepolymer can be reacted with a deficiency of the functionally-symmetric crosslinker, based on the total amount of secondary amines available for crosslinking, to provide the partially crosslinked polyamine prepolymer or partially crosslinked resin. Thus, the partially crosslinked polyamine prepolymer or resin can have a greater weight average molecular weight than the polyamine prepolymer, even though the partially crosslinked polyamine prepolymer or resin can be an intermediate in the process and can retain a portion of the secondary amine groups present in the polyamine prepolymer. In some examples, the partially crosslinked polyamine prepolymer or resin can retain a majority of the secondary amine groups present in the polyamine prepolymer, because less than 50% of the stoichiometric amount of the functionally-symmetric crosslinker can be used.

Based on the prepolymer repeating unit having a single secondary amine subject to reaction, and the functionally-symmetric crosslinker having two reactive moieties, a stoichiometric reaction of prepolymer to crosslinker requires a 2:1 molar ratio, and practically, greater than a 2:1 molar ratio of prepolymer to crosslinker. The functionally-symmetric crosslinker to prepolymer molar ratios can be selected to provide more than 0%, but less than 50%, less than 45%, less than 40%, less than 35%, less than 30%, less than 25%, less than 20%, less than 15%, less than 10%, less than 5%, less than 4%, less than 3%, less than 2%, less than 1%, less than 0.75%, or less than 0.5% of the stoichiometric ratio of crosslinker to prepolymer. These values reflect the combined molar amounts when using more than one functionally-symmetric crosslinker.

Examples of functionally-symmetric crosslinkers can be or include, but are not limited to, a diacrylate compound, a bis(acrylamide) compound, a bis(methacrylamide) compound, a diepoxide compound, a polyazetidinium compound, a diisocyanate compound, a 1,3-dialkyldiazetidine-2,4-dione compound, a dianhydride compound, a diacyl halide compound, a dienone compound, a dialkyl halide compound, a dialdehyde compound, or any mixture thereof. By way of example, useful functionally-symmetric crosslinkers can be or include one of the following:

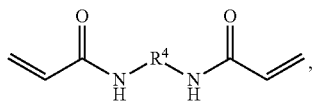

where $R^4$ can be $(CH_2)_t$ and t can be 1, 2, 3, or 4;

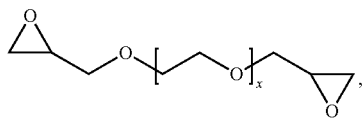

where x can be 1 to about 100;

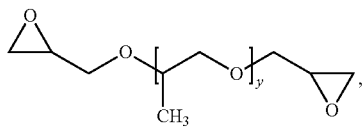

where y can be 1 to about 100;

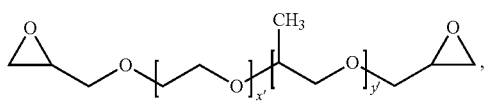

where x'+y' can be 1 to about 100; and/or

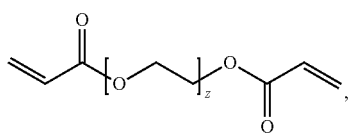

where z can be 1 to about 100; or any mixture thereof.

Illustrative symmetric crosslinkers can be or include, but are not limited to, N,N'-methylenebisacrylamide (MBA), N,N'-methylenebismethacrylamide (MBMA), a poly(alkylene glycol) diglycidyl ether, a poly(alkylene glycol) diacrylate, one or more polyazetidinium compounds, isomers thereof, alkylated derivatives thereof, salts thereof, or any mixture thereof. As such, in some examples the primary crosslinking moieties can be derived from N,N'-methylenebisacrylamide (MBA), N,N'-methylenebismethacrylamide (MBMA), a poly(alkylene glycol) diglycidyl ether, a poly(alkylene glycol) diacrylate, one or more polyazetidinium compounds, isomers thereof, alkylated derivatives thereof, salts thereof, or any mixture thereof. Illustrative poly(alkylene glycol) diglycidyl ethers can include, but are not limited to, poly(ethyleneglycol) diglycidyl ether (PEG-DGE), poly(propyleneglycol) diglycidyl ether (PPG-DGE), or a mixture thereof. Illustrative poly(alkylene glycol) diacrylates can include, but are not limited to, poly(ethyleneglycol) diacrylate (PEG-DA), poly(propyleneglycol) diacrylate (PPG-DA), or a mixture thereof.

The diisocyanate can be unblocked or blocked. Illustrative unblocked diisocyanates can include, but are not limited to, 4,4'-methylene diphenyl diisocyanate (methylene diphenyl diisocyanate, MDI); toluene-2,4-diisocyanate (toluene diisocyanate, TDI); 1,6-hexane diisocyanate (hexamethylene diisocyanate, HDI); 5-isocyanato-1-(isocyanatomethyl)-1,3,3-trimethyl-cyclohexane (isophorone diisocyanate, IPDI), or any mixture thereof. Illustrative blocked diisocyanates can include, but are not limited to, bis-caprolactam blocked 4,4'-methylene diphenyl diisocyanate; 4,4'-methylene diphenyl diisocyanate bis(2-butanone oxime) adduct, bis-(3,5-dimethylpyrazole) blocked 4,4'-methylene diphenyl diisocyanate, or any mixture thereof. Commercially available blocked diisocyanates can include, but are not limited to, the TRIXENE®. BI products available from Baxenden Chemicals such as TRIXENE® BI 7641, 7642, 7674, 7675, 7950, 7951, 7960, 7961, 7963, and 7982, and the RUCO-Guard products available from Rudolf Group such as RUCO-Guard XCR, XTN, FX 8011, FX 8021, NET, TIE, and WEB.

Illustrative 1,3-dialkyldiazetidine-2,4-diones can include, but are not limited to, 1,3-diazetidine-2,4-dione; 1,3-dimethyl-1,3-diazetidine-2,4-dione; 1,3-diethyl-1,3-diazetidine-2,4-dione; 1,3-Diphenyl-1,3-diazetidine-2,4-dione; or any mixture thereof. Illustrative dianhydrides can include, but are not limited to, pyromellitic dianhydride; ethylene glycol bis(trimellitic anhydride); 4,4'-bisphenol A dianhydride, or any mixture thereof. Illustrative diacyl halides can include, but are not limited to, oxalyl chloride, oxalyl bromide, succinyl chloride, benzene-1,2-dicarbonyl dichloride, benzene-1,2-dicarbonyl bromide, phthaloyl chloride, or any mixture thereof. Illustrative dienones can include, but are not limited to, 1,7-octadiene-3,6-dione; bis(2-propen-1-one)-(1,4-benzene), or any mixture thereof. Illustrative dialkyl halides can include, but are not limited to, 1,2-dichloroethane; 1,2-dibromoethane; 1,2-diiodoethane; 1,2-dichloropropane; 1,2-dibromopropane; 1,3-dichloropropane; 1,3-dibromopropane; 1,3-diiodopropane; 1,4-bis(chloromethyl)benzene; 1,4-bis(bromomethyl)benzene, or any mixture thereof. Illustrative dialdehydes can include, but are not limited to, dialdehydes having the formula OHC $(CH_2)_n$CHO, where n is 0 to about 8, and mixtures thereof. Specific dialdehydes can include, but are not limited to, glyoxal, pyruvic aldehyde, succinaldehyde, glutaraldehyde, and 2-hydroxyadipaldehyde.

The functionally-symmetric crosslinker can be or include certain polymers or copolymers that have a type of functional moiety that can be reactive with secondary amines, i.e., that can function as the functionally-symmetric crosslinkers discussed and described herein. In some examples, the functionally-symmetric crosslinkers can be polymers or copolymers that have azetidinium functional groups. The functionally-symmetric crosslinkers can be, for example, copolymers of acrylates, methacrylates, alkenes, dienes, or derivatives thereof, with azetidinium-functionalized monomers. Illustrative azetidinium-functionalized monomers can include, but are not limited to, 1-isopropyl-3-(methacryloyloxy)-1-methylazetidinium chloride having the chemical formula (E), 1,1-diallyl-3-hydroxyazetidinium chloride having the chemical formula (F), other halogen derivatives thereof, salts thereof, or mixtures thereof:

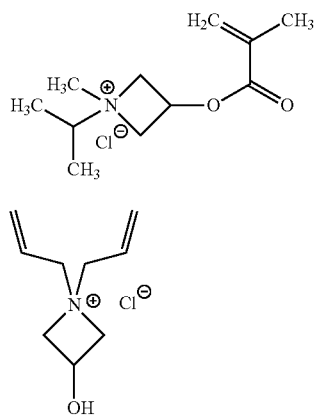

(E)

(F)

The functionally-symmetric crosslinkers can also be or include, copolymers of one or more acrylates, one or more methacrylates, one or more alkenes, one or more dienes, or any combination thereof with other azetidinium-functionalized monomers. Other illustrative azetidinium-functionalized monomers can include, but are not limited to, compounds having the chemical formulas (G), (H), and (I):

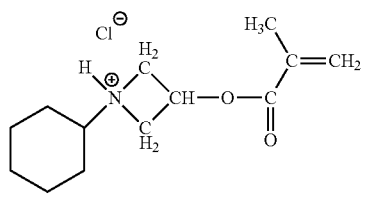

(G)

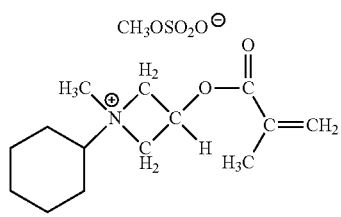

(H)

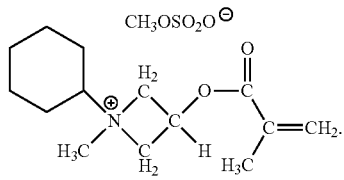

(I)

In another example, the functionally-symmetric crosslinker can be or include a copolymer of an acrylate monomer, a methacrylate monomer, an alkene monomer, or a diene monomer, with an azetidinium-functionalized monomer that can be or include one or more of the compounds having the chemical formulas (E), (F), (G), (H), (I), derivatives thereof, isomers thereof, halides thereof (replacement of Cl with F, Br, or I), or any mixture thereof, where the fraction of azetidinium-functionalized monomer to the acrylate monomer, the methacrylate monomer, the alkene monomer, or the diene monomer in the copolymer can be about 0.1% to about 12%. In some examples, the fraction of azetidinium-functionalized monomer to the acrylate monomer, the methacrylate monomer, the alkene monomer, or the diene monomer in the copolymer can be from about 0.2% to about 10%, about 0.5% to about 10%, about 0.5% to about 8%, about 0.75% to about 6%, or about 1% to about 5%. Examples of these types of functionally-symmetric crosslinker polymers and copolymers can be found in the following references: Y. Bogaert, E. Goethals, and E. Schacht, *Makromol. Chem.*, 182, 2687-2693 (1981); M. Coskun, H. Erten, K. Demirelli, and M. Ahmedzade, *Polym. Degrad. Stab.*, 69, 245-249 (2000); and U.S. Pat. No. 5,510,004.

The functionally-symmetric crosslinker can be or include a relatively lower azetidinium-functionalized polyamidoamine. That is, the polyamidoamine can have relatively lower azetidinium functionalization, which can be the reactive moiety in this type of functionally-symmetric crosslinker. In this aspect, the crosslinking function can be effected by the azetidinium moieties, which can react with secondary amines of the polyamidoamine prepolymer. Polyamidoamines that can be used to prepare the relatively lower azetidinium-functionalized polyamidoamines can have the same general structures and formulas that can be used for the preparation of the resin itself, such as the resins having the chemical formulas (K), (L), (M), and (N) provided below.

An example of a relatively lower azetidinium-functionalized polyamidoamine suitable for use as a functionally-symmetric crosslinker can have the following chemical formula (J):

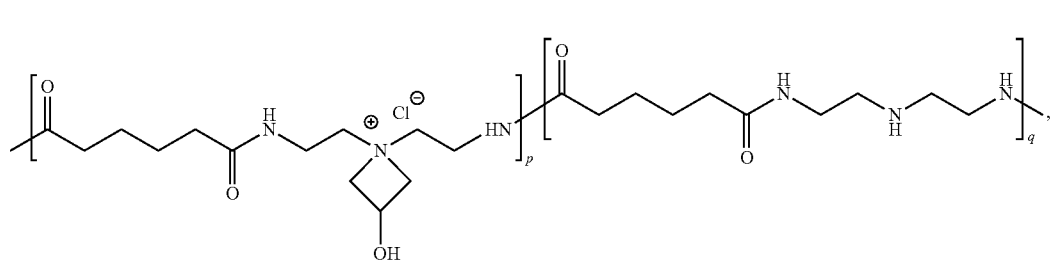

(J)

where p can be greater than or equal to 2 and the q/p ratio can be about 10 to about 1,000. The polyamidoamine (J) can include at least two azetidinium moieties that function to crosslink, and that qualify the polyamidoamine as a functionally-symmetric crosslinker. As the q/p ratio indicates, there can be a small fraction of azetidinium moieties as compared to acid and amine residues. Moreover, the polyamidoamine (J) can also have the structure where the q/p ratio can be about 12 to about 500; about 14 to about 400; about 16 to about 300; about 18 to about 200; or about 20 to about 100. One type of relatively lower azetidinium-functionalized polyamidoamine can be provided in, for example, U.S. Pat. No. 6,277,242.

As illustrated by the molar ratios of the functionally-symmetric crosslinker to the polyamidoamine prepolymer, generally, a relatively small fraction of the available secondary amine sites can be subject to crosslinking to form the branched or partially crosslinked polyamidoamine polymer. In addition to the molar ratios provided herein, for example, the functionally-symmetric crosslinker to prepolymer molar ratios can be selected to provide about 0.01% to about 5% of the stoichiometric ratio of crosslinker to prepolymer. In some examples, the functionally-symmetric crosslinker to prepolymer molar ratios can provide about 0.1% to about 4%; about 0.2% to about 3.5%; about 0.3% to about 3%; about 0.4% to about 2.5%; about 0.5% to about 2%; or about 0.6% to about 1.5% of the stoichiometric ratio of crosslinker to prepolymer. These values reflect the combined molar amounts when using more than one functionally-symmetric crosslinker.

In some examples, one or more polyamidoamine prepolymers and one or more functionally-symmetric crosslinkers can be combined and reacted to make, form, or otherwise produce a partially crosslinked resin having secondary amines, such as a partially crosslinked polyamidoamine resin. The partially crosslinked resin can be or include one or more crosslinked resins having the following chemical formula (K):

In other examples, the partially crosslinked resin (K) can have the crosslinking moiety $R^X$ with the chemical formula:

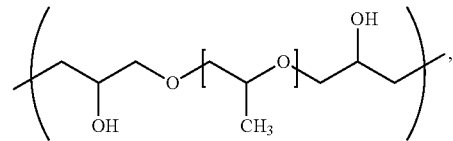

where the crosslinking moiety $R^X$ can be derived from PPG-DGE.

In some examples, the $M_w$ of the partially crosslinked resin (K) can be about 50,000, about 60,000, about 70,000, about 80,000, about 90,000, or about 100,000 to about 120,000, about 150,000, about 200,000, about 300,000, about 500,000, about 700,000, about 800,000, about 1,000,000, about 1,200,000, about 1,400,000, about 1,500,000, about 1,600,000, about 1,800,000, about 2,000,000, about 2,500,000, about 3,000,000, about 3,500,000, about 4,000,000, or greater. For example, the $M_w$ of the partially crosslinked resin (K) can be about 50,000 to about 4,000,000; about 50,000 to about 3,000,000; about 50,000 to about 2,000,000; about 50,000 to about 1,000,000; about 80,000 to about 4,000,000; about 80,000 to about 3,000,000; about 80,000 to about 2,000,000; about 80,000 to about 1,000,000; about 120,000 to about 4,000,000; about 120,000 to about 3,000,000; about 120,000 to about 2,000,000; about 120,000 to about 1,000,000; about 300,000 to about 3,000,000; about 300,000 to about 2,000,000; about 300,000 to about 1,000,000; about 300,000 to about 800,000; or about 300,000 to about 500,000.

Mono-Functional Modifier

The secondary amine groups of the polyamine prepolymers can also be reacted with one or more mono-functional

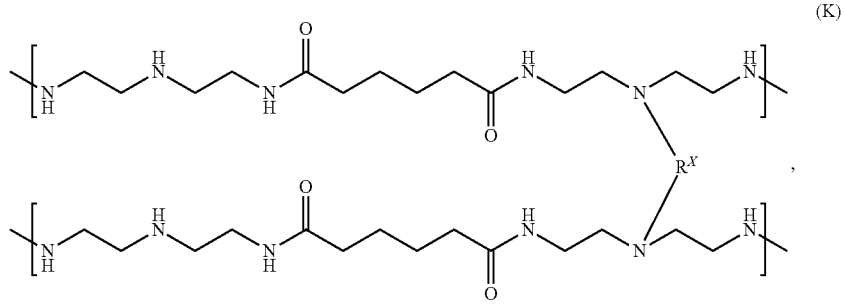

(K)

where the crosslinking moiety $R^X$ can be a primary crosslinking moiety made, derived, or otherwise produced from the functionally-symmetric crosslinker.

By way of example, using a polyamidoamine prepolymer derived from adipic acid and DETA, and crosslinking the polyamidoamine prepolymer using MBA, the partially crosslinked resin (K) can have the crosslinking moiety $R^X$ with the chemical formula:

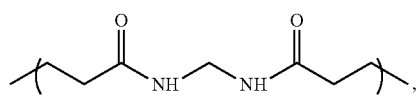

where the crosslinking moiety $R^X$ can be derived from MBA.

modifiers to impart any desired chemical functionality to the polyamidoamine prepolymer. The mono-functional modifiers have a reactive group that can react with secondary or primary amines and a non-reactive part that can be cationic (to increase the cationic charge density), hydrophilic or hydrophobic (to adjust the interaction with non-ionic segments of the cellulose fibers). As desired, the polyamine prepolymer can be reacted with a deficiency of the mono-functional modifier containing one secondary amine-reactive moiety before, during, or after, the step of reacting the polyamine prepolymer with a deficiency of the functionally-symmetric crosslinker. Further, the reaction with a stoichiometric deficiency of a mono-functional modifier can also be carried using any combination of reaction or addition before, during, or after, reaction with the functionally-symmetric crosslinker.

The mono-functional modifier can be or include a neutral or cationic acrylate compound, a neutral or cationic acrylamide compound, an acrylonitrile compound, a mono-epoxide compound, or any combination thereof. In some examples, the mono-functional modifier can be or include an alkyl acrylate, acrylamide, an alkyl acrylamide, a dialkyl acrylamide, acrylonitrile, a 2-alkyl oxirane, a 2-(allyloxyalkyl)oxirane, a hydroxyalkyl acrylate, an ω-(acryloyloxy)-alkyltrimethylammonium compound, an ω-(acrylamido)-alkyltrimethylammonium compound, or any mixture thereof. Exemplary mono-functional modifiers can have the following chemical formulas:

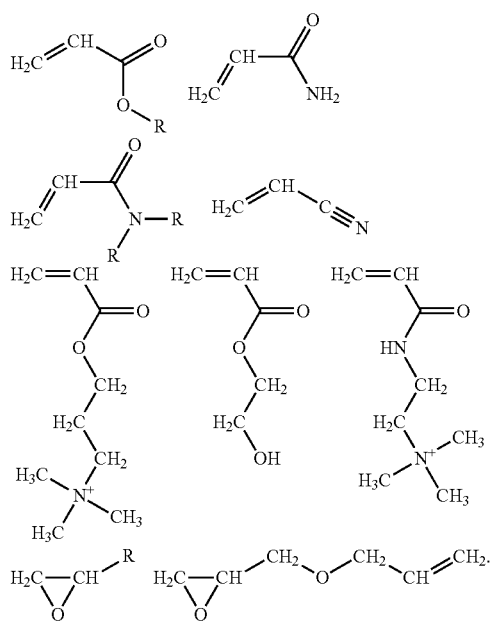

The mono-functional modifier can be or include at least one of: methyl acrylate; alkyl acrylate; acrylamide; N-methylacrylamide; N,N'-dimethylacrylamide; acrylonitrile; 2-methyloxirane; 2-ethyloxirane; 2-propyloxirane; 2-(allyloxymethyl)oxirane; 2-hydroxyethyl acrylate; 2-(2-hydroxyethoxy)ethyl acrylate; 2-(acryloyloxy)-N,N,N-trimethylethanaminium; 3-(acryloyloxy)-N,N,N-trimethylpropan-1-aminium; 2-acryl amido-N,N,N-trimethylethanaminium; 3-acryl amido-N,N,N-trimethylpropan-1-aminium; and 1-isopropyl-3-(methacryloyloxy)-1-methylazetidinium chloride. Depending, at least in part, on the structure of the modifier, upon reaction of these compounds with a secondary or primary amine, the portion that can be non-reactive toward the amine can impart cationic charge to assist in increasing the cationic charge density, can alter the hydrophilic or hydrophobic characteristics, for example to adjust the interaction with non-ionic segments of the cellulose fibers, and/or can affect other properties of the resulting crosslinked resin and/or functionalized crosslinked resin.

Halohydrin-Functionalized Resin and Intramolecular Cyclization

Functionalized crosslinked resin can be produced by separating the synthesis into discrete reactions or reaction steps. The reaction of the polyamine prepolymer with the functionally-symmetric crosslinkers to produce the partially crosslinked resin can be in a first reaction or first reaction step. Thereafter, the reaction of the partially crosslinked resin with the one or more epichlorohydrin can be in a second reaction or reaction step and/or a third reaction or reaction step to produce the crosslinked resin and/or the functionalized crosslinked resin. The second and third reactions or reaction steps can be effected under reaction conditions that favor optimized azetidinium group formation over further crosslinking. The asymmetric functionality of epichlorohydrin can be useful in this functionalization to allow a relatively facile reaction of the epoxy group with secondary amines to form a pendent chlorohydrin moiety, followed by an intramolecular cyclization of the pendent chlorohydrin to generate a cationic azetidinium functionality. This latter intramolecular cyclization can utilize heating of the halohydrin-functionalized resin.

The second reaction step can be carried out using any epihalohydrin, such as epichlorohydrin, epibromohydrin, epiiodohydrin, or any mixture thereof. When reciting epichlorohydrin herein, such as in structures or reaction schemes, it is understood that any one or any mixture of the various epihalohydrins can be used in the processes or compositions.

By way of example, the partially crosslinked resin that can be derived from adipic acid and DETA and crosslinking using MBA can be reacted with an epihalohydrin to produce a halohydrin-functionalized resin. The halohydrin-functionalized resin can have the following chemical formula (L):

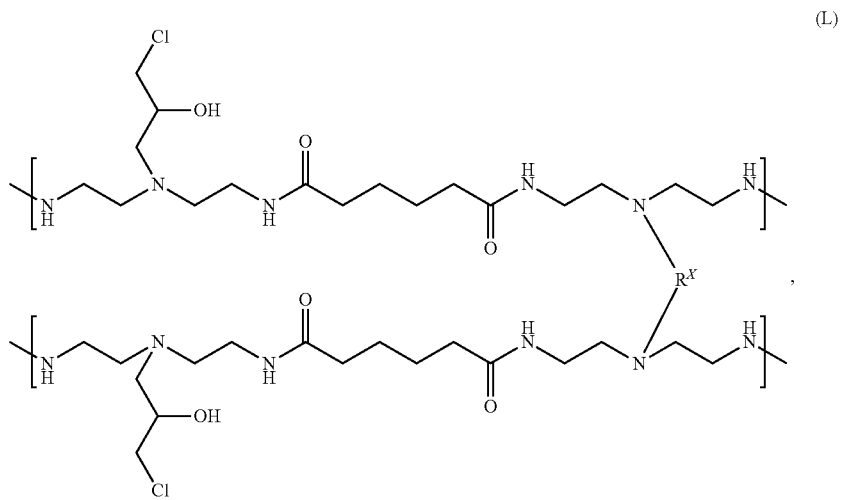

where the epihalohydrin is epichlorohydrin. As before, the halohydrin-functionalized resin (L) does not reflect the use of any mono-functional modifiers in addition to the functionally-symmetric crosslinker.

The crosslinked resins, including the halohydrin-functionalized resin (L), can have a pendent halohydrin ratio (e.g., chlorohydrin ratio). The pendent halohydrin ratio is the ratio of the polymer segments containing a pendent halohydrin to the total number of polymer segments. A single polymer segment is defined by a condensation moiety derived from one diacid molecule (for example, adipic acid) and one triamine molecule (for example, diethylenetriamine or DETA), as illustrated below:

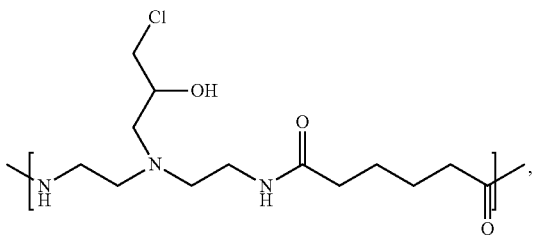

where the pendent halohydrin is a pendent chlorohydrin. The degree of substitution of pendent halohydrin on the polymer backbone can be determined by quantitative (inverse gated heteronuclear decoupled) $^{13}C$ NMR spectroscopy, using a relaxation time of 30 seconds, spectral width of 15 kHz (240 ppm), and a scan count of 320 scans. Measurements can be made by integration of the hydroxylmethine peak in the pendent halohydrin group and the inner carbons of the adipic acid portion of the polymer. The adipic acid portion can be assigned to be the total number of polymer segments. Thus when the polymer can be prepared using adipic acid, the degree of substitution of pendent chlorohydrin on the polymer backbone can be determined according to the formula: pendent halohydrin ratio=A(pendent halohydrin)×2/A(adip), where, A(pendent halohydrin) is the integrated area of hydroxylmethine from pendent halohydrin, and A(adip) is the integrated area of methylenes from the adipic moiety (total polymer segments). This method can be adapted to any resin discussed and described herein. Thus, for adipic acid based polymers, the hydroxylmethine peak from pendent chlorohydrin at 66.3 ppm and the backbone methylene peak at 25.6 ppm can both be integrated and the methylene peak at 25.7 ppm can be normalized to 1. For glutaric acid based polymers, the hydroxylmethine peak from pendent chlorohydrin at 66.3 ppm and the backbone methylene peak at 22.2 ppm can both be integrated and the methylene peak at 22.2 ppm can be normalized to 1, and the formula can be pendent chlorohydrin content=A(pendent chlorohydrin)/A(glutaric).

The reaction of epihalohydrins can generally be tailored to consume a desired amount of the remaining secondary amine moieties in generating the halohydrin-functionalized resin, in this aspect, a chlorohydrin-functionalized resin. The formation of the halohydrin-functionalized resin can be carried out using a molar deficiency of epichlorohydrin relative to the remaining secondary amine moieties to provide epichlorohydrin to secondary amine molar ratios of less than 1. The moles of epichlorohydrin per mole of secondary amine combined, reacted, or otherwise used to produce the halohydrin-functionalized resin can be about 0.01 mol, about 0.03 mol, about 0.05 mol, about 0.07 mol, about 0.09 mol, about 0.1 mol, about 0.15 mol, about 0.2 mol, about 0.25 mol, about 0.3 mol, about 0.35 mol, about 0.4 mol, or about 0.45 mol to about 0.5 mol, about 0.55 mol, about 0.6 mol, about 0.65 mol, about 0.7 mol, about 0.75 mol, about 0.8 mol, about 0.85 mol, about 0.9 mol, about 0.95 mol, or less than 1 mol. For example, the halohydrin-functionalized resin can be produced from a reaction of epichlorohydrin and the secondary amine group combined at a ratio of moles of epichlorohydrin per mole of secondary amine at about 0.01 mol to less than 1 mol, about 0.05 mol to less than 1 mol, about 0.1 mol to less than 1 mol, about 0.3 mol to less than 1 mol, about 0.5 mol to less than 1 mol, about 0.7 mol to less than 1 mol, about 0.01 mol to about 0.7 mol, about 0.05 mol to about 0.7 mol, about 0.1 mol to about 0.7 mol, about 0.3 mol to about 0.7 mol, about 0.5 mol to about 0.7 mol, about 0.01 mol to about 0.6 mol, about 0.05 mol to about 0.6 mol, about 0.1 mol to about 0.6 mol, about 0.2 mol to about 0.6 mol, about 0.3 mol to about 0.6 mol, about 0.4 mol to about 0.6 mol, about 0.5 mol to about 0.6 mol, about 0.01 mol to about 0.5 mol, about 0.05 mol to about 0.5 mol, about 0.1 mol to about 0.5 mol, about 0.2 mol to about 0.5 mol, about 0.3 mol to about 0.5 mol, about 0.4 mol to about 0.5 mol, about 0.01 mol to about 0.4 mol, about 0.05 mol to about 0.4 mol, about 0.1 mol to about 0.4 mol, about 0.2 mol to about 0.4 mol, or about 0.3 mol to about 0.4 mol.

Sufficient amounts of functionally-symmetric crosslinker and epihalohydrin can be employed such that the crosslinked resins prepared by the process can be free or substantially free of the original secondary amines in the polyamine or the polyamidoamine prepolymer. This result can be effected by using the molar amounts and ratios discussed and described herein, but the crosslinked resins described herein can be free or substantially free of secondary amine groups even when molar amounts and ratios outside those discussed and described herein are used. In some examples, the crosslinked resins can be free or substantially free of secondary amine groups and can have less than 10% of the original secondary amines in the polyamine or the polyamidoamine prepolymer. For example, the crosslinked resin can have less than 5%, less than 2%, less than 1%, less than 0.5%, less than 0.2%, less than 0.1%, less than 0.01%, less than 0.005%, or less than 0.001% of the original secondary amines in the polyamine or the polyamidoamine prepolymer.

The halohydrin-functionalized resin (e.g., chlorohydrin-functionalized resin) (L) can be converted to an azetidinium-functionalized crosslinked resin by subjecting the halohydrin-functionalized resin to cyclization conditions to form azetidinium ions. This step can include heating the chlorohydrin-functionalized resin. The crosslinking portion of the process described herein can already be complete when the cyclization is carried out, thereby affording greater process control and the ability to more closely tailor the desired properties of the resulting resin. The synthesis processes described herein can reduce and/or minimize the formation of DCP, CPD, and/or other epichlorohydrin by-products remaining in the resin can be reduced or minimized.

In some examples, the concentration of each of DCP and/or CDP remaining in the crosslinked resin at 25 wt % solids (DCP @ 25%) can independently be less than 15,000 ppm. For example, the crosslinked resin at 25 wt % solids can be less than 14,000 ppm, less than 13,000 ppm, less than 12,000 ppm, less than 11,500 ppm, less than 11,000 ppm, less than 10,500 ppm, less than 10,000 ppm, less than 8,000 ppm, less than 6,000 ppm, less than 5,000 ppm.

The chlorohydrin-functionalized resin (L) can be subjected to conditions sufficient to intramolecularly cyclize the pendent chlorohydrin to impart azetidinium functionality during a cyclization step. The product resin is the azetidinium-functionalized crosslinked resin having the following chemical formula (M):

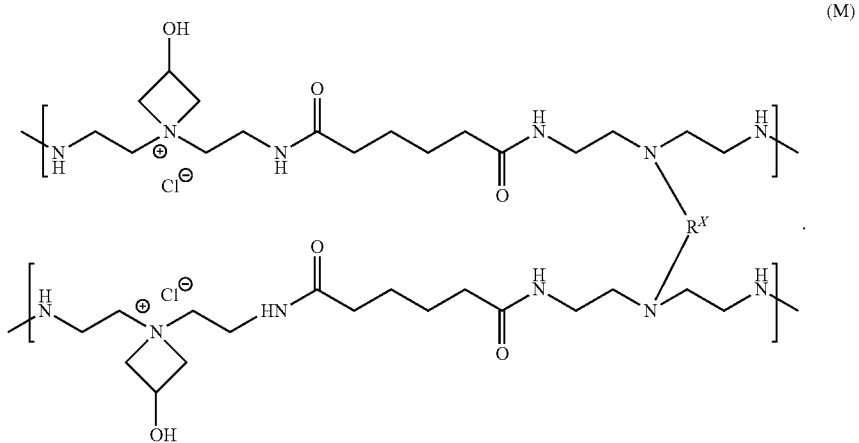

(M)

The azetidinium-functionalized crosslinked resin (M) can be generated by subjecting the halohydrin-functionalized resin (L) to cyclization conditions sufficient to convert the halohydrin groups to form azetidinium ions. In some examples, at least a portion of the halohydrin groups can be cyclized to form azetidinium ions. For example, at least 90%, at least 91%, at least 92%, at least 93%, at least 94%, at least 95%, at least 97%, at least 98%, at least 98.5%, at least 99%, at least 99.5%, at least 99.7%, at least 99.8%, or at least 99.9% of the halohydrin groups can be cyclized to form azetidinium ions. In other examples, greater than 90%, greater than 91%, greater than 92%, greater than 93%, greater than 94%, greater than 95%, greater than 96%, greater than 97%, greater than 98%, greater than 99%, greater than 99.3%, greater than 99.5%, greater than 99.7%, or greater than 99.9% of the halohydrin groups can be cyclized to form azetidinium ions.

The pendent halohydrin groups can be maintained as pendent halohydrin groups (e.g., the halohydrin-functionalized resin (L)) and/or can be cyclized to form azetidinium ions (e.g., the azetidinium-functionalized crosslinked resin (M)). The amount of the pendent halohydrin groups can be measured via titration with silver nitrate. More particularly, the total chloride content for a first sample of the crosslinked resin can be measured by refluxing in the presence of a hydroxide (e.g., potassium hydroxide or sodium hydroxide) to convert all of the covalently-bound chlorides to chloride ions, neutralizing with nitric acid, and titrating with a silver nitrate solution. The total chloride content, therefore, is the sum of covalently-bound chlorides and ionic chlorides. The ionic chloride content can be measured on a second sample of the crosslinked resin, which does not involve refluxing in the presence of the hydroxide. The total chloride content minus the ionic chloride content is the covalent chloride content. The covalent chloride content is also equal to the amount of pendent halohydrin groups.

The halohydrin-functionalized resin (L) can have about 0.05 wt %, about 0.1 wt %, about 0.15 wt %, about 0.2 wt %, about 0.25 wt %, or about 0.3 wt % to about 0.35 wt %, about 0.4 wt %, about 0.45 wt %, about 0.5 wt %, about 0.55 wt %, about 0.6 wt %, or greater of pendent halohydrin groups (e.g., covalent chloride), based on the total weight of the halohydrin-functionalized resin. For example, the halohydrin-functionalized resin (L) can have about 0.05 wt % to about 0.5 wt %, about 0.1 wt % to about 0.5 wt %, about 0.2 wt % to about 0.5 wt %, about 0.3 wt % to about 0.5 wt %, about 0.05 wt % to about 0.4 wt %, about 0.1 wt % to about 0.4 wt %, about 0.2 wt % to about 0.4 wt %, or about 0.3 wt % to about 0.4 wt % of pendent halohydrin groups, based on the total weight of the halohydrin-functionalized resin.

The $M_w$ of the resin (L) or (M) can be about 50,000, about 60,000, about 70,000, about 80,000, about 90,000, or about 100,000 to about 120,000, about 150,000, about 200,000, about 300,000, about 500,000, about 700,000, about 800,000, about 1,000,000, about 1,200,000, about 1,400,000, about 1,500,000, about 1,600,000, about 1,800,000, about 2,000,000, about 2,500,000, about 3,000,000, about 3,500,000, about 4,000,000, or greater. For example, the $M_w$ of the resin (L) or (M) can be about 50,000 to about 4,000,000; about 50,000 to about 3,000,000; about 50,000 to about 2,000,000; about 50,000 to about 1,000,000; about 80,000 to about 4,000,000; about 80,000 to about 3,000,000; about 80,000 to about 2,000,000; about 80,000 to about 1,000,000; about 120,000 to about 4,000,000; about 120,000 to about 3,000,000; about 120,000 to about 2,000,000; about 120,000 to about 1,000,000; about 300,000 to about 3,000,000; about 300,000 to about 2,000,000; about 300,000 to about 1,000,000; about 300,000 to about 800,000; or about 300,000 to about 500,000.

The resin (L) or (M) can have a charge density that can be enhanced over that of conventional resins. For example, the crosslinked resin can have a charge density of about 2 mEq/g of solids to about 4 mEq/g of solids. For example, the crosslinked resin can have a charge density of about 2.25 mEq/g of solids to about 3.5 mEq/g of solids; about 2.3 mEq/g of solids to about 3.35 mEq/g of solids; about 2.4 mEq/g of solids to about 3.2 mEq/g of solids; or about 2.5 mEq/g of solids to about 3.0 mEq/g of solids. The charge density of the crosslinked resin can be measured by streaming electrode potential using a titrator or a particle charge detector (PCD), such as a Mütek PCD.

The crosslinked resins, including the azetidinium-functionalized resin (M), can have an azetidinium ratio, or "Azet" ratio. The Azet ratio is the ratio of the polymer segments containing an azetidinium ion to the total number of polymer segments. A single polymer segment is defined by a condensation moiety derived from one diacid molecule (for example, adipic acid) and one triamine molecule (for example, diethylenetriamine or DETA), as illustrated below.

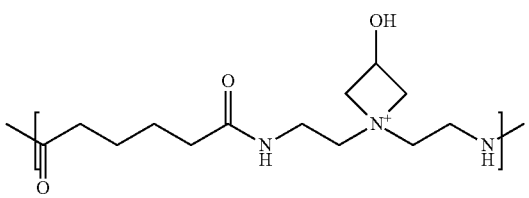

The azetidinium ratio can be determined by quantitative (inverse gated heteronuclear decoupled) $^{13}C$ NMR spectroscopy, using a relaxation time of 22.5 seconds, spectral width of 15 kHz (240 ppm), and a scan count of 320 scans to 1,024 scans. Measurements can be made by integration of the methylene peaks in the azetidinium ion and the inner carbons of the diacid portion of the polymer. The diacid portion can be assigned to be the total number of polymer segments. Thus when the polymer is prepared using adipic acid, the azetidinium ratio can be determined according to the formula: Azetidinium Ratio (Azet Ratio)=A(azet)/A(adip), where, A(azet) is the integrated area of methylenes from azetidinium ions, and A(adip) is the integrated area of methylenes from the adipic moiety (total polymer segments). This method can be adapted to any resin discussed and described herein. Thus, for adipic acid based polymers, the azetidinium ion peak at 74 ppm and the backbone methylene peak at 25 ppm can both be integrated and the methylene peak at 25 ppm can be normalized to 1. For glutaric acid based polymers, the azetidinium ion peak at 74 ppm and the backbone methylene peak at 22 ppm can both be integrated and the methylene peak at 22 ppm can be normalized to 1.

As such, the azetidinium-functionalized crosslinked resin having chemical formula (M), can have an azetidinium ratio of about 0.00001, about 0.0001, or about 0.0005 to about 0.001, about 0.003, about 0.005, about 0.007, about 0.009, about 0.01, about 0.03, about 0.05, about 0.07, about 0.09, or about 0.1. In other examples, the azetidinium-functionalized crosslinked resin having chemical formula (M) can have an azetidinium ratio of less than 0.1, less than 0.09, less than 0.07, less than 0.05, less than 0.03, less than 0.01, less than 0.009, less than 0.007, less than 0.005, less than 0.003, less than 0.001, less than 0.0005, less than 0.0001, less than 0.00001, or lower. For example, the azetidinium-functionalized crosslinked resin having chemical formula (M) can have an azetidinium ratio of about 0.00001 to about 0.05, about 0.0001 to about 0.05, about 0.001 to about 0.05, about 0.01 to about 0.05, about 0.00001 to about 0.01, about 0.0001 to about 0.01, about 0.001 to about 0.01, about 0.00001 to about 0.1, about 0.0001 to about 0.1, about 0.001 to about 0.1, or about 0.01 to about 0.1. In some specific examples, the azetidinium-functionalized crosslinked resin having chemical formula (M) can have a pendent halohydrin ratio of less than 0.1, such as, for example, about 0.001 to about 0.05 and an azetidinium ratio of less than 0.1, such as, for example, about 0.001 to about 0.01.

In other examples, the functionalized crosslinked resins can be made by introducing or otherwise combining one or more epihalohydrins by a single-phase process or a multi-phase process to the crosslinked resin. In some examples, one or more epihalohydrins can be added to or combined with the partially crosslinked resin having polyamidoamine backbones crosslinked by primary crosslinking moieties by a single-phase process to produce the functionalized crosslinked resin. In other examples, one or more epihalohydrins can be added to or combined with the partially crosslinked resin in stoichiometric deficient amounts in each of two or more steps via the multi-phase process to produce the functionalized crosslinked resin. By stoichiometric deficient, the epihalohydrin can be added to or combined with the crosslinked resin in an amount of less than 1 molar ratio—that is—less than 1 mole of epihalohydrin per mole of the secondary amines of the crosslinked resin having primary crosslinking moieties. In some examples, one or more epihalohydrins can be added to or combined with the crosslinked resin in stoichiometric deficient amounts to produce the non-functionalized crosslinked resin, and subsequently, one or more epihalohydrins can be added to or combined with the non-functionalized crosslinked resin to produce the functionalized crosslinked resin.

Additional Resins for Crepe Adhesives Including Class I, II, and III Adhesives

In one or more examples, one or more partially crosslinked resin having secondary amines can be used as a starting material to produce different resins that can used as or in a crepe adhesive. For example, one or more polyamidoamine prepolymers and one or more functionally-symmetric crosslinkers can be reacted to make, form, or otherwise produce a partially crosslinked resin having secondary amines. In some examples, the partially crosslinked resin can have the following chemical formula (N):

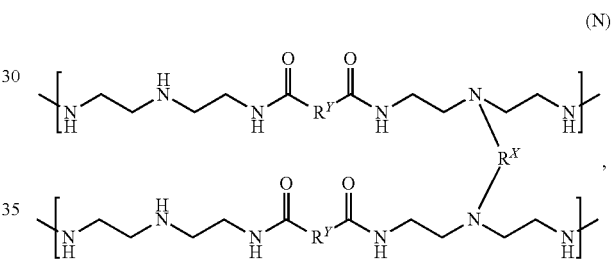

where the crosslinking moiety $R^X$ can be a primary crosslinking moiety made, derived, or otherwise produced from one or more functionally-symmetric crosslinkers; and $R^Y$ can be a substituted or unsubstituted organic diyl moiety. The diyl moiety $R^Y$ can be a $C_1$-$C_5$ diyl moiety. For example, the diyl moiety $R^Y$ can be methanediyl (—$CH_2$—), ethanediyl (—$CH_2CH_2$—), propanediyl (—$CH_2CH_2CH_2$—), butanediyl (—$CH_2(CH_2)_2CH_2$—), pentanediyl (—$CH_2(CH_2)_3CH_2$—), isomers thereof, halide-substituted derivatives thereof, or alkyl-substituted derivatives thereof. In some examples, the partially crosslinked resin (N) can be made, formed, or otherwise produced from a polyamidoamine prepolymer derived from glutaric acid and DETA and the diyl moiety $R^Y$ can be a $C_3$ diyl moiety, such as a propanediyl moiety. In other examples, the partially crosslinked resin (N) can be made, formed, or otherwise produced from a polyamidoamine prepolymer derived from adipic acid and DETA and the diyl moiety $R^Y$ can be a $C_4$ diyl moiety, such as a butanediyl moiety.

The $M_w$ of the partially crosslinked resin (N) can be about 50,000, about 60,000, about 70,000, about 80,000, about 90,000, or about 100,000 to about 120,000, about 150,000, about 200,000, about 300,000, about 500,000, about 700,000, about 800,000, about 1,000,000, about 1,200,000, about 1,400,000, about 1,500,000, about 1,600,000, about 1,800,000, about 2,000,000, about 2,500,000, about 3,000,000, about 3,500,000, about 4,000,000, or greater. For example, the $M_w$ of the partially crosslinked resin (N) can be about 50,000 to about 4,000,000; about 50,000 to about 3,000,000; about 50,000 to about 2,000,000; about 50,000 to about 1,000,000; about 80,000 to about 4,000,000; about 80,000 to about 3,000,000; about 80,000 to about 2,000,000; about 80,000 to about 1,000,000; about 120,000 to about 4,000,000; about 120,000 to about 3,000,000; about 120,000 to about 2,000,000; about 120,000 to about 1,000,000; about 300,000 to about 3,000,000; about 300,000 to about 2,000,000, about 300,000 to about 1,000,000; about 300,000 to about 800,000; or about 300,000 to about 500,000.

The partially crosslinked resin (N) can be reacted with one or more acids to make, form, or otherwise produce a crosslinked resin or "acidified crosslinked resin". The acidified crosslinked resin can have the following chemical formula (O):

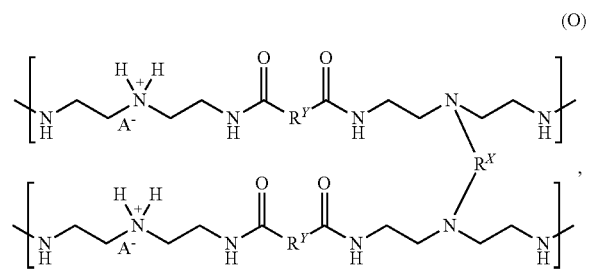

where the crosslinking moiety $R^X$ can be a primary crosslinking moiety made, derived, or otherwise produced from one or more functionally-symmetric crosslinkers; each $R^1$ can be a substituted or unsubstituted organic diyl moiety; and each $A^-$ can be an anion. Free amines disposed on the partially crosslinked resin (N) can be protonated by the one or more acids to produce ammonium moieties on the acidified crosslinked resin (O). In one or more examples, the acidified crosslinked resin (O) can be a thermoplastic polymer and utilized as a creping adhesive, such as a Class I adhesive, that can have thermoplastic properties. In some examples, the partially crosslinked resin (N) can be reacted with a single acid or a mixture of acids to produce the acidified crosslinked resin (O). In other examples, two, three, four, or more different types of the acidified crosslinked resins (O) with distinct anions $A^-$ can be combined and mixed to produce a mixture of acidified crosslinked resins with multiple types of anions $A^-$.

The anion $A^-$ can be one or more conjugate bases derived from the one or more acids used to produce the acidified crosslinked resin (O). The acids can be or include one or more mineral acids, one or more organic acids, or any mixture thereof. Illustrative acids can be or include, but are not limited to, one or more of: hydrochloric acid, phosphoric acid, phosphorous acid, hypophosphorous acid, phosphonic acids, sulfuric acid, sulfurous acid, sulfonic acid, persulfuric acid, peroxydisulfuric acid, sulfur oxoacids, carbonic acid, oxalic acid, boric acid, acetic acid, formic acid, citric acid, ascorbic acid, salts thereof, or any mixture thereof. Each anion $A^-$ can independently be the same or different on the acidified crosslinked resin (O). The anion $A^-$ can be, but is not limited to, a halide, such as fluoride, chloride, bromide, or iodide, a sulfur oxide, such as bisulfate ($HSO_4^-$), sulfate ($SO_4^{2-}$), bisulfite ($HSO_3^-$), or sulfite ($SO_3^{2-}$); a phosphorous oxide, such as hydrogenphosphite ($HP(O)_2(OH)^-$), phosphite ($HPO_3^{2-}$), phosphate ($PO_4^{3-}$); any conjugate base of its respective acid, such as acetate, formate, citrate, ascorbate, oxalate, or borate; salts thereof; isomers thereof; or any mixture thereof.

The acidified crosslinked resin (O) is illustrated with two ammonium moieties and two anions $A^-$ and with a formal charge of −1 per crosslinked resin segment. The crosslinked resin segment is defined as shown in the chemical formula (O), where two polymer segments are crosslinked by one crosslinking moiety $R^X$, and each polymer segment has a crosslinked triamine moiety and a non-crosslinked triamine moiety. The acidified crosslinked resin (O), however, can have about 25%, about 50%, or about 70% to about 80%, about 90%, about 95%, or 100% of the secondary amines protonated to produce ammonium moieties with respective anions $A^-$. Further, the anion $A^-$ can have a formal charge of −1, but can also have a formal charge of −2, −3, or greater and can have one or more counter cations (e.g., $H^+$, $Li^+$, $Na^+$, $K^+$, etc.) and/or can be bridging two or more ammonium groups and/or other cation groups disposed on the acidified crosslinked resin (O).

One or more acids can be combined and reacted with the partially crosslinked resin (N) in an amount of about 0.005 g, about 0.01 g, about 0.03 g, or about 0.05 to about 0.07 g, about 0.09 g, about 0.1 g, about 0.15 g, about 0.2 g, about 0.25 g, about 0.3 g, about 0.35 g, about 0.4 g, about 0.45 g, about 0.5 g, about 0.55 g, about 0.6 g, about 0.7 g, about 0.8 g, about 0.9 g, or about 1 g per gram of the partially crosslinked resin (N) to produce the acidified crosslinked resin (O). For example, the acid can be combined and reacted with the partially crosslinked resin (N) in an amount of about 0.005 g to about 1 g, about 0.01 g to about 1 g, about 0.03 g to about 1 g, about 0.04 g to about 1 g, about 0.05 g to about 1 g, about 0.07 g to about 1 g, about 0.09 g to about 1 g, about 0.1 g to about 1 g, about 0.3 g to about 1 g, about 0.4 g to about 1 g, about 0.5 g to about 1 g, about 0.7 g to about 1 g, about 0.9 g to about 1 g, about 0.005 g to about 0.7 g, about 0.01 g to about 0.7 g, about 0.03 g to about 0.7 g, about 0.04 g to about 0.7 g, about 0.05 g to about 0.7 g, about 0.07 g to about 0.7 g, about 0.09 g to about 0.7 g, about 0.1 g to about 0.7 g, about 0.3 g to about 0.7 g, about 0.4 g to about 0.7 g, about 0.5 g to about 0.7 g, about 0.005 g to about 0.5 g, about 0.01 g to about 0.5 g, about 0.03 g to about 0.5 g, about 0.04 g to about 0.5 g, about 0.05 g to about 0.5 g, about 0.07 g to about 0.5 g, about 0.09 g to about 0.5 g, about 0.1 g to about 0.5 g, about 0.3 g to about 0.5 g, about 0.4 g to about 0.5 g, about 0.005 g to about 0.4 g, about 0.01 g to about 0.4 g, about 0.03 g to about 0.4 g, about 0.04 g to about 0.4 g, about 0.05 g to about 0.4 g, about 0.07 g to about 0.4 g, about 0.09 g to about 0.4 g, about 0.1 g to about 0.4 g, or about 0.3 g to about 0.4 g per gram of the partially crosslinked resin (N) to produce the acidified crosslinked resin (O). In some examples, aqueous hydrochloric acid (about 37 wt % HCl and about 63% water) can be combined and reacted with the partially crosslinked resin (N) in an amount of about 0.01 g to about 0.4 g or about 0.05 g to about 0.3 g to produce the acidified crosslinked resin (O). In other examples, aqueous phosphoric acid (about 85 wt % $H_3PO_4$ and about 15% water) can be combined and reacted with the partially crosslinked resin (N) in an amount of about 0.01 g to about 0.5 g or about 0.05 g to about 0.35 g to produce the acidified crosslinked resin (O).

The acidified crosslinked resin (O) can have a pH of about 2, about 3, about 4, or about 4.5 to about 5, about 6, about 7, about 7.5, about 8, or about 8.5 at a temperature of about 25° C. For example, the acidified crosslinked resin (O) can have a pH of about 2 to about 8.5, about 2 to about 8, about 2 to about 7.5, about 2 to about 7, about 2 to about 6.5, about 2 to about 6, about 2 to about 5.5, about 2 to about 5, about 2 to about 4.5, about 2 to about 4, about 2 to about 3.5, about 2 to about 3, about 3 to about 8.5, about 3 to about 8, about 3 to about 7.5, about 3 to about 7, about 3 to about 6.5, about 3 to about 6, about 3 to about 5.5, about 3 to about 5, about 3 to about 4.5, about 3 to about 4, about 3 to about 3.5, about 3.5 to about 8.5, about 3.5 to about 8, about 3.5 to about 7.5, about 3.5 to about 7, about 3.5 to about 6.5, about 3.5 to about 6, about 3.5 to about 5.5, about 3.5 to about 5, about 3.5 to about 4.5, or about 3.5 to about 4.

The acidified crosslinked resin (O) can have a pH of about 2, about 2.5, about 3, about 3.5, or about 4 to less than 5, less than 6, less than 7, less than 7.5, less than 8, or less than 8.5 at 25° C. For example, the acidified crosslinked resin (O) can have a pH of about 2 to less than 8.5, about 2 to less than 8, about 2 to less than 7.5, about 2 to less than 7, about 2 to less than 6.5, about 2 to less than 6, about 2 to less than 5.5, about 2 to less than 5, about 2 to less than 4.5, about 2 to less than 4, about 2 to less than 3.5, about 2 to less than 3, about 3 to less than 8.5, about 3 to less than 8, about 3 to less than 7.5, about 3 to less than 7, about 3 to less than 6.5, about 3 to less than 6, about 3 to less than 5.5, about 3 to less than 5, about 3 to less than 4.5, about 3 to less than 4, about 3 to less than 3.5, about 3.5 to less than 8.5, about 3.5 to less than 8, about 3.5 to less than 7.5, about 3.5 to less than 7, about 3.5 to less than 6.5, about 3.5 to less than 6, about 3.5 to less than 5.5, about 3.5 to less than 5, about 3.5 to less than 4.5, or about 3.5 to less than 4.

The acidified crosslinked resin (O) can have a peel adhesion of 2, 3, or greater times in value than the same, but non-acidified, partially crosslinked resin (N). That is, the acidified resin (O) can have a greater peel adhesion than the partially crosslinked resin (N) for the same base resins of the chemical formulas (N) and (O) that have the same crosslinking moieties $R^X$ and diyl moieties $R^Y$, and a molecular weight that is the same or substantially the same.

The creping adhesive containing the partially crosslinked resin (N) can have a peel adhesion of about 10 g/cm, about 15 g/cm, about 20 g/cm, or about 25 g/cm, to about 30 g/cm, about 35 g/cm, about 40 g/cm, about 45 g/cm, about 50 g/cm, about 55 g/cm, or about 60 g/cm. The creping adhesive containing the acidified crosslinked resin (O) can have a peel adhesion of about 30 g/cm, about 40 g/cm, about 50 g/cm, or about 60 g/cm to about 70 g/cm, about 80 g/cm, about 90 g/cm, about 100 g/cm, about 110 g/cm, about 120 g/cm, about 130 g/cm, about 140 g/cm, about 150 g/cm, about 160 g/cm, or greater.

In some examples, for the same base resins of the chemical formulas (N) and (O) that have the same crosslinking moieties $R^X$ and diyl moieties $R^Y$, the partially crosslinked resin (N) can have a peel adhesion of less than 30 g/cm and the acidified resin (O) can have a peel adhesion of 30 g/cm or greater. For example, the partially crosslinked resin (N) can have a peel adhesion of about 10 g/cm, about 15 g/cm, or about 18 g/cm to less than 20 g/cm, less than 25 g/cm, or less than 30 g/cm and the acidified resin (O) can have a peel adhesion of 30 g/cm, about 40 g/cm, or about 50 g/cm to about 60 g/cm, about 70 g/cm, about 80 g/cm, about 100 g/cm, about 125 g/cm, or about 150 g/cm, where the crosslinking moieties $R^X$ and the diyl moieties $R^Y$ are the same for both of the resins (N) and (O).

In other examples, for the same base resins of the chemical formulas (N) and (O) that have the same crosslinking moieties $R^X$ and diyl moieties $R^Y$, the partially crosslinked resin (N) can have a peel adhesion of less than 50 g/cm and the acidified resin (O) can have a peel adhesion of 50 g/cm or greater. For example, the partially crosslinked resin (N) can have a peel adhesion of about 15 g/cm, about 20 g/cm, or about 25 g/cm to less than 30 g/cm, less than 40 g/cm, or less than 50 g/cm and the acidified resin (O) can have a peel adhesion of 50 g/cm, about 60 g/cm, or about 70 g/cm to about 80 g/cm, about 90 g/cm, about 100 g/cm, about 110 g/cm, about 130 g/cm, or about 150 g/cm, where the crosslinking moieties $R^X$ and the diyl moieties $R^Y$ are the same for both of the resins (N) and (O).

The partially crosslinked resin (N) can be reacted with one or more (first) epihalohydrins to make, form, or otherwise produce a crosslinked resin or "epified crosslinked resin". The epified crosslinked resin can have the following chemical formula (P):

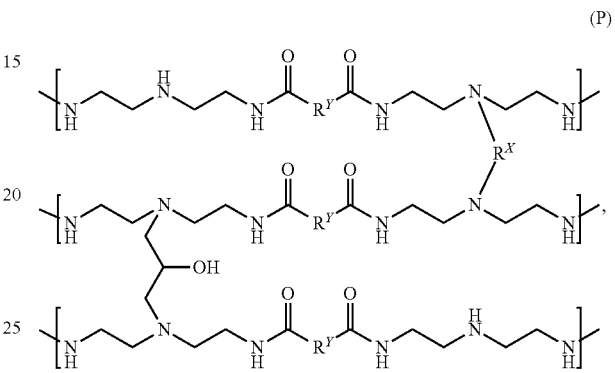

where $R^X$ can be a crosslinking moiety and each $R^Y$ can independently be a substituted or unsubstituted organic diyl moiety.

The epified crosslinked resin (P) can include polyamidoamine backbones crosslinked by primary crosslinking moieties derived from the functionally-symmetric crosslinker and propanediyl crosslinking moieties derived from the epihalohydrin. In one or more examples, the epified crosslinked resin (P) can be a thermoplastic polymer and utilized as a creping adhesive, such as a Class II adhesive, that can have thermoplastic properties.

In some examples, a first epihalohydrin or one or more epihalohydrins can be added to or combined with the partially crosslinked resin (N) in a substoichiometric amount or otherwise in an amount of less than 1, less than 0.6, or less than 0.5 molar ratio to produce a first mixture. The amount of less than 1 molar ratio means less than 1 mole of epihalohydrin per mole of the secondary amines of the partially crosslinked resin having primary crosslinking moieties. The first epihalohydrin can be added to or combined with the partially crosslinked resin in an amount of about 0.001 mol, about 0.005 mol, about 0.01 mol, about 0.02 mol, about 0.03 mol, about 0.04 mol, about 0.05 mol, about 0.06 mol, about 0.07 mol, about 0.08 mol, or about 0.09 mol per mole of the secondary amines to about 0.1 mol, about 0.15 mol, about 0.2 mol, about 0.25 mol, about 0.3 mol, about 0.35 mol, about 0.4 mol, about 0.45 mol, about 0.5 mol, about 0.55 mol, about 0.6 mol, about 0.65 mol, about 0.7 mol, about 0.8 mol, about 0.9 mol, or less than 1 mol per mole of the secondary amines of the partially crosslinked resin to produce the first mixture. In another example, the first epihalohydrin can be added to or combined with the partially crosslinked resin in an amount of about 0.005 mol to less than 1 mol, about 0.01 mol to less than 1 mol, about 0.1 mol to less than 1 mol, about 0.2 mol to less than 1 mol, about 0.3 mol to less than 1 mol, about 0.4 mol to less than 1 mol, about 0.5 mol to less than 1 mol, about 0.01 mol to about 0.8 mol, about 0.1 mol to about 0.8 mol, about 0.2 mol to about 0.8 mol, about 0.3 mol to about 0.8 mol, about 0.4 mol to about 0.8 mol, about 0.5 mol to about 0.8 mol, about 0.01 mol to about 0.6 mol, about 0.1 mol to about 0.6 mol, about 0.2 mol to about 0.6 mol, about 0.3 mol to about 0.6 mol, about 0.4 mol to about 0.6 mol, about 0.5 mol to about 0.6 mol, about 0.01 mol to about 0.5 mol, about 0.1 mol to about 0.5 mol, about 0.2 mol to about 0.5 mol, about 0.3 mol to about 0.5 mol, or about 0.4 mol to about 0.5 mol per mole of the secondary amines of the partially crosslinked resin to produce the first mixture.

In other examples, the first epihalohydrin can be added to or combined with the partially crosslinked resin in an amount of about 0.005 mol to less than 0.9 mol, about 0.01 mol to less than 0.9 mol, about 0.1 mol to less than 0.9 mol, about 0.2 mol to less than 0.9 mol, about 0.3 mol to less than 0.9 mol, about 0.4 mol to less than 0.9 mol, about 0.5 mol to less than 0.9 mol, about 0.005 mol to less than 0.7 mol, about 0.01 mol to less than 0.7 mol, about 0.1 mol to less than 0.7 mol, about 0.2 mol to less than 0.7 mol, about 0.3 mol to less than 0.7 mol, about 0.4 mol to less than 0.7 mol, about 0.5 mol to less than 0.7 mol, about 0.005 mol to less than 0.5 mol, about 0.01 mol to less than 0.5 mol, about 0.1 mol to less than 0.5 mol, about 0.2 mol to less than 0.5 mol, about 0.3 mol to less than 0.5 mol, or about 0.4 mol to less than 0.5 mol per mole of the secondary amines of the partially crosslinked resin to produce the first mixture. In some specific examples, the first epihalohydrin can be combined with the partially crosslinked resin in an amount of about 0.005 mol to less than 1 or about 0.005 mol to about 0.5 mol per mole of the secondary amines of the partially crosslinked resin to produce the first mixture.

The first mixture can include one or more first epihalohydrins and the partially crosslinked resin (N) and can be heated to a first temperature to produce the epified crosslinked resin (P). The first temperature can be about 20° C., about 25° C., about 30° C., or about 35° C. to about 40° C., about 45° C., about 50° C., about 55° C., about 60° C., about 65° C., about 70° C., about 75° C., about 80° C., about 85° C., about 90° C., or about 100° C. The first temperature can be about 20° C. to about 100° C., about 20° C. to about 90° C., about 25° C. to about 90° C., about 25° C. to about 80° C., about 25° C. to about 70° C., about 25° C. to about 60° C., about 25° C. to about 50° C., about 25° C. to about 40° C., about 30° C. to about 100° C., about 30° C. to about 60° C., or about 30° C. to about 40° C. The first mixture can be heated at the first temperature for about 1 min, about 2 min, about 5 min, or about 10 min to about 12 min, about 15 min, about 20 min, about 30 min, about 40 min, about 50 min, about 60 min, about 90 min, about 120 min, or longer. For example, the first mixture can be heated at the first temperature for about 1 min to about 120 min, about 2 min to about 90 min, about 3 min to about 60 min, about 3 min to about 40 min, about 3 min to about 20 min, about 3 min to about 10 min, about 5 min to about 60 min, about 5 min to about 40 min, about 5 min to about 20 min, about 5 min to about 10 min, about 10 min to about 60 min, about 10 min to about 40 min, or about 10 min to about 20 min.

A pendent halohydrin ratio of the epified crosslinked resin (P) can be determined based on the degree of substitution of the halohydrin group linker on the polymer backbone can be determined by quantitative (inverse gated heteronuclear decoupled) $^{13}C$ NMR spectroscopy, as further discussed above. Measurements can be made by integration of the hydroxylmethine peak in the halohydrin group linker and the inner carbons of the adipic acid portion (adipic moiety) of the polymer. The epified crosslinked resin (P) can have a pendent halohydrin ratio of about 0.00001, about 0.0001, or about 0.0005 to about 0.001, about 0.003, about 0.005, about 0.007, about 0.009, about 0.01, about 0.03, about 0.05, about 0.07, about 0.09, or about 0.1. In other examples, the epified crosslinked resin (P) can have a pendent halohydrin ratio of less than 0.1, less than 0.09, less than 0.07, less than 0.05, less than 0.03, less than 0.01, less than 0.009, less than 0.007, less than 0.005, less than 0.003, less than 0.001, less than 0.0005, less than 0.0001, less than 0.00001, or lower. For example, the crosslinked resin can (P) can have a pendent halohydrin ratio of 0.00001 to about 0.05, about 0.0001 to about 0.05, about 0.001 to about 0.05, about 0.01 to about 0.05, about 0.00001 to about 0.01, about 0.0001 to about 0.01, about 0.001 to about 0.01, about 0.00001 to about 0.1, about 0.0001 to about 0.1, about 0.001 to about 0.1, or about 0.01 to about 0.1.

The epified crosslinked resin (P) can have an azetidinium ratio of about 0.00001, about 0.0001, or about 0.0005 to about 0.001, about 0.003, about 0.005, about 0.007, about 0.009, about 0.01, about 0.03, about 0.05, about 0.07, about 0.09, or about 0.1. In other examples, the epified crosslinked resin (P) can have an azetidinium ratio of less than 0.1, less than 0.09, less than 0.07, less than 0.05, less than 0.03, less than 0.01, less than 0.009, less than 0.007, less than 0.005, less than 0.003, less than 0.001, less than 0.0005, less than 0.0001, less than 0.00001, or lower. For example, the crosslinked resin can (P) can have an azetidinium ratio of about 0.00001 to about 0.05, about 0.0001 to about 0.05, about 0.001 to about 0.05, about 0.01 to about 0.05, about 0.00001 to about 0.01, about 0.0001 to about 0.01, about 0.001 to about 0.01, about 0.00001 to about 0.1, about 0.0001 to about 0.1, about 0.001 to about 0.1, or about 0.01 to about 0.1. In some specific examples, the epified crosslinked resin (P) can have a pendent halohydrin ratio of less than 0.1, such as, for example, about 0.001 to about 0.05 and an azetidinium ratio of less than 0.1, such as, for example, about 0.001 to about 0.01.

In some examples, the halohydrin-functionalized resin (L) can be subjected to conditions that favor crosslinking reactions. As such, the halohydrin-functionalized resin (L) can be converted to a crosslinked resin having polyamidoamine backbones crosslinked by primary crosslinking moieties derived from the functionally-symmetric crosslinker and propanediyl crosslinking moieties derived from the epihalohydrin. The crosslinked resin can have the chemical formula (P), where the crosslinking moiety $R^X$ can be a —$(CH_2CH_2C(O)NHCH_2NHC(O)CH_2CH_2)$— group derived from MBA or a —$(CH_2CH(OH)CH_2O[CH_2CH(CH_3)O]CH_2CH(OH)CH_2)$— group derived from PPG-DGE, and the diyl moiety $R^Y$ can be a butanediyl moiety derived from adipic acid.

In some examples, a second mixture that includes the crosslinked resin that can have the chemical formula (P) can be cooled, heated, or maintained at a second temperature. The (second) temperature of the second mixture can be less than the (first) temperature of the first mixture as discussed above. For example, the first temperature can be greater than 30° C. to about 100° C. and the second temperature can be about 0° C. to less than 30° C. In another example, the first temperature can be about 20° C. to about 90° C. and the second temperature can be about 20° C. to about 70° C., but less than the first temperature. One or more (second) epihalohydrins and the second mixture at the second temperature can be mixed or otherwise combined to produce a functionalized crosslinked resin. In some examples, the functionalized crosslinked resin can have the following chemical formula (Q):

(Q)

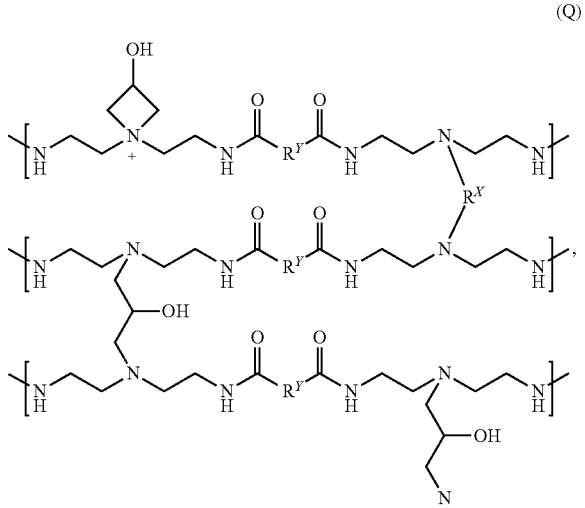

where $R^X$ can be a crosslinking moiety and $R^Y$ can be a substituted or unsubstituted organic diyl moiety. The functionalized crosslinked resin (Q) can include azetidinium moieties and pendent halohydrin moieties disposed on the polyamidoamine backbones crosslinked by the primary crosslinking moieties and the propanediyl crosslinking moieties. In one or more examples, the functionalized crosslinked resin (Q) can be a thermosetting polymer and can be utilized as a creping adhesive, such as a Class III adhesive, that can have thermosetting properties.

In some examples, the second epihalohydrin or one or more epihalohydrins can be added to or combined with the second mixture such that the crosslinked resin can have the chemical formula (P) in a substoichiometric amount or otherwise in an amount of less than 1, less than 0.5, or less than 0.4 molar ratio to produce the functionalized crosslinked resin that can have the chemical formula (Q). The second epihalohydrin can be added to or combined with the crosslinked resin in an amount of about 0.005 mol, about 0.01 mol, about 0.05 mol, about 0.07 mol, or about 0.09 mol per mole of the secondary amines to about 0.1 mol, about 0.15 mol, about 0.2 mol, about 0.25 mol, about 0.3 mol, about 0.35 mol, about 0.4 mol, about 0.45 mol, about 0.5 mol, about 0.55 mol, about 0.6 mol, about 0.65 mol, about 0.7 mol, about 0.75 mol, about 0.8 mol, about 0.85 mol, about 0.9 mol, about 0.95 mol, about 0.97 mol, about 0.99, or less than 1 mol per mole of the secondary amines of the crosslinked resin to produce the functionalized crosslinked resin.

For example, the second epihalohydrin can be added to or combined with the crosslinked resin in an amount of about 0.005 mol to less than 0.9 mol, about 0.01 mol to less than 0.9 mol, about 0.1 mol to less than 0.9 mol, about 0.2 mol to less than 0.9 mol, about 0.3 mol to less than 0.9 mol, about 0.4 mol to less than 0.9 mol, about 0.5 mol to less than 0.9 mol, about 0.005 mol to about 0.6 mol, about 0.01 mol to about 0.6 mol, about 0.1 mol to about 0.6 mol, about 0.2 mol to about 0.6 mol, about 0.3 mol to about 0.6 mol, about 0.4 mol to about 0.6 mol, about 0.5 mol to about 0.6 mol, about 0.005 mol to about 0.5 mol, about 0.01 mol to about 0.5 mol, about 0.1 mol to about 0.5 mol, about 0.2 mol to about 0.5 mol, about 0.3 mol to about 0.5 mol, about 0.4 mol to about 0.5 mol, about 0.5 mol, about 0.005 mol to about 0.4 mol, about 0.01 mol to about 0.4 mol, about 0.1 mol to about 0.4 mol, about 0.2 mol to about 0.4 mol, or about 0.3 mol to about 0.4 mol per mole of the secondary amines of the crosslinked resin to produce the functionalized crosslinked resin. In some specific examples, the second epihalohydrin can be combined with the crosslinked resin in an amount of about 0.005 mol to less than 1 or about 0.005 mol to about 0.4 mol per mole of the secondary amines of the crosslinked resin to produce the functionalized crosslinked resin.

The second mixture can include one or more second epihalohydrins and the crosslinked resin that can have the chemical formula (P) and can be cooled, heated, or maintained at a second temperature to produce the functionalized crosslinked resin (Q). The second temperature can be about 0° C., about 5° C., about 10° C., about 15° C., about 20° C., about 25° C., about 30° C., or about 35° C. to about 40° C., about 45° C., about 50° C., about 55° C., about 60° C., about 65° C., about 70° C., about 75° C., about 80° C., about 85° C., or about 90° C. The second temperature can be about 0° C. to about 90° C., about 0° C. to about 80° C., about 0° C. to about 70° C., about 0° C. to about 50° C., about 20° C. to about 80° C., about 20° C. to about 70° C., about 20° C. to about 50° C., about 20° C. to about 40° C., about 20° C. to about 30° C., about 30° C. to about 80° C., about 30° C. to about 70° C., about 30° C. to about 50° C., or about 30° C. to about 40° C. The second mixture can be cooled, heated, or maintained at the second temperature for about 1 min, about 2 min, about 5 min, or about 10 min to about 12 min, about 15 min, about 20 min, about 30 min, about 40 min, about 50 min, about 60 min, about 90 min, about 120 min, or longer. For example, the second mixture can be cooled, heated, or maintained at the second temperature for about 1 min to about 120 min, about 2 min to about 90 min, about 3 min to about 60 min, about 3 min to about 40 min, about 3 min to about 20 min, about 3 min to about 10 min, about 5 min to about 60 min, about 5 min to about 40 min, about 5 min to about 20 min, about 5 min to about 10 min, about 10 min to about 60 min, about 10 min to about 40 min, or about 10 min to about 20 min.

The amount of the pendent halohydrin groups contained by the functionalized crosslinked resin (Q) can be measured via titration with silver nitrate, as discussed above. The total chloride content is the sum of the contents of covalently-bound chlorides and ionic chlorides. Since the amount of pendent halohydrin groups is the same as the amount of covalent chloride, the pendent halohydrin group content of the functionalized crosslinked resin (Q) is equal to the total chloride content minus the ionic chloride content. The functionalized crosslinked resin (Q) can have about 0.05 wt %, about 0.1 wt %, about 0.15 wt %, about 0.2 wt %, about 0.25 wt %, or about 0.3 wt % to about 0.35 wt %, about 0.4 wt %, about 0.45 wt %, about 0.5 wt %, about 0.55 wt %, about 0.6 wt %, or greater of pendent halohydrin groups (e.g., covalent chloride), based on the total weight of the functionalized crosslinked resin. For example, the functionalized crosslinked resin (Q) can have about 0.05 wt % to about 0.5 wt %, about 0.1 wt % to about 0.5 wt %, about 0.2 w % to about 0.5 wt %, about 0.3 wt % to about 0.5 wt %, about 0.05 wt % to about 0.4 wt %, about 0.1 wt % to about 0.4 wt %, about 0.2 wt % to about 0.4 wt %, or about 0.3 wt % to about 0.4 wt % of pendent halohydrin groups, based on the total weight of the functionalized crosslinked resin.

The functionalized crosslinked resin (Q) can have a pendent halohydrin ratio of about 0.0005, about 0.001, about 0.005, about 0.01, about 0.015, about 0.02, about 0.025, or about 0.03 to about 0.035, about 0.04, about 0.05, about 0.06, about 0.07, about 0.08, about 0.09, about 0.1, about 0.12, about 0.15, about 0.2, about 0.3, about 0.4, about 0.5, about 0.6, about 0.7, about 0.8, or about 0.9. In other examples, the functionalized crosslinked resin (Q) can have a pendent halohydrin ratio of less than 0.2, less than 0.15, less than 0.1, less than 0.09, less than 0.07, less than 0.05, less than 0.03, less than 0.01, less than 0.009, less than 0.007, less than 0.005, less than 0.003, less than 0.001, less than 0.0005, less than 0.0001, less than 0.00001, or lower. For example, the functionalized crosslinked resin (Q) can have a pendent halohydrin ratio of 0.0005 to about 0.09, about 0.001 to about 0.07, about 0.001 to about 0.05, about 0.001 to about 0.01, about 0.005 to about 0.01, about 0.01 to about 0.09, about 0.01 to about 0.07, about 0.01 to about 0.05, or about 0.01 to about 0.03.

The functionalized crosslinked resin (Q) can have an azetidinium ratio of about 0.0005, about 0.001, about 0.01, about 0.02, or about 0.03 to about 0.04, about 0.05, about 0.06, about 0.07, about 0.08, about 0.09, about 0.1, about 0.12, about 0.15, about 0.2, about 0.3, about 0.5, about 0.7, or about 0.9. In other examples, the functionalized crosslinked resin (Q) can have an azetidinium ratio of less than 0.3, less than 0.2, less than 0.15, less than 0.1, less than 0.09, less than 0.08, less than 0.07, less than 0.06, less than 0.05, less than 0.04, less than 0.03, less than 0.02, less than 0.01, less than 0.009, less than 0.007, less than 0.005, less than 0.003, less than 0.001, less than 0.0005, or lower. For example, the functionalized crosslinked resin (Q) can have an azetidinium ratio of about 0.0005 to about 0.15, about 0.0005 to about 0.1, about 0.0005 to about 0.09, about 0.0005 to about 0.07, about 0.0005 to about 0.05, about 0.001 to about 0.15, about 0.001 to about 0.1, about 0.001 to about 0.09, about 0.001 to about 0.07, about 0.001 to about 0.05, about 0.001 to about 0.04, about 0.005 to about 0.15, about 0.005 to about 0.1, about 0.005 to about 0.09, about 0.005 to about 0.07, about 0.005 to about 0.05, about 0.005 to about 0.04, about 0.005 to about 0.03, about 0.005 to about 0.02, about 0.005 to about 0.01, about 0.01 to about 0.15, about 0.01 to about 0.1, about 0.01 to about 0.09, about 0.01 to about 0.07, about 0.01 to about 0.05, about 0.01 to about 0.04, about 0.01 to about 0.03, about 0.01 to about 0.02, about 0.02 to about 0.15, about 0.02 to about 0.1, about 0.02 to about 0.09, about 0.02 to about 0.07, about 0.02 to about 0.05, about 0.02 to about 0.04, or about 0.02 to about 0.03. In some specific examples, the functionalized crosslinked resin (Q) can have a pendent halohydrin ratio of 0.2, such as, for example, about 0.01 to about 0.12, about 0.01 to about 0.1, or about 0.02 to about 0.08 and an azetidinium ratio of less than 0.2, such as, for example, about 0.005 to about 0.1, about 0.01 to about 0.1, or about 0.02 to about 0.07.

The functionalized crosslinked resin (Q) can have a pendent halohydrin to azetidinium ratio of about 1:1, about 1:2, about 1:3, or about 1:4 to about 1:5, about 1:6, about 1:7, about 1:8, about 1:9, about 1:10, about 1:11, about 1:12, about 1:15, or about 1:20. For example, the functionalized crosslinked resin (Q) can have a pendent halohydrin to azetidinium ratio of about 1:1 to about 10:1, about 2:1 to about 10:1, about 3:1 to about 10:1, about 4:1 to about 10:1, about 5:1 to about 10:1, about 6:1 to about 10:1, about 7:1 to about 10:1, about 8:1 to about 10:1, about 9:1 to about 10:1, about 1:1 to about 12:1, about 2:1 to about 12:1, about 4:1 to about 12:1, about 6:1 to about 12:1, about 8:1 to about 12:1, about 10:1 to about 12:1, about 1:1 to about 20:1, about 2:1 to about 20:1, about 4:1 to about 20:1, about 6:1 to about 20:1, about 8:1 to about 20:1, or about 10:1 to about 20:1. In one specific example, the functionalized crosslinked resin (Q) can have a pendent halohydrin to azetidinium ratio of about 3:1 to about 10:1.

The $M_w$ of the epified crosslinked resin (P) and the functionalized crosslinked resin (Q) each can independently be about 50,000, about 80,000, about 100,000, about 120,000, about 150,000, or about 200,000 to about 300,000, about 500,000, about 800,000, about 1,000,000, about 1,200,000, about 1,500,000, about 1,800,000, about 2,000,000, about 2,200,000, about 2,500,000, about 2,800,000, about 3,000,000, about 3,200,000, about 3,500,000, about 3,800,000, about 4,000,000, about 4,500,000, about 5,000,000, or greater. For example, the $M_w$ of the epified crosslinked resin (P) and the functionalized crosslinked resin (Q) each can independently be about 50,000 to about 5,000,000; about 50,000 to about 4,000,000; about 50,000 to about 3,000,000; about 50,000 to about 2,000,000; about 50,000 to about 1,000,000; about 80,000 to about 5,000,000; about 80,000 to about 4,000,000; about 80,000 to about 3,000,000; about 80,000 to about 2,000,000; about 80,000 to about 1,000,000; about 150,000 to about 5,000,000; about 150,000 to about 4,000,000; about 150,000 to about 3,000,000; about 150,000 to about 2,000,000; about 150,000 to about 1,000,000; about 500,000 to about 3,000,000; about 500,000 to about 2,000,000; about 500,000 to about 1,000,000; or about 500,000 to about 800,000.

The functionalized crosslinked resin can have an azetidinium equivalent weight, defined as the degree of polymerization multiplied by the Azet ratio, or (degree of polymerization)×(Azet). The functionalized crosslinked resin can have an azetidinium equivalent weight of about 1,600, about 1,800, or about 2,000 to about 2,100, about 2,500, about 2,700, about 2,900, about 3,000, about 3,200, about 3,500, about 3,800, or about 4,000. For example, the functionalized crosslinked resin can have an azetidinium equivalent weight of about 1,600 to about 3,800, about 1,800 to about 3,500, or about 2,000 to about 2,900.

Additional steps in the preparation of the crosslinked resin can be used, for example, to adjust the solids content of the crosslinked resin, beyond those described in detail above. For example, the crosslinked resin can be generated by converting the halohydrin-functionalized resin to an azetidinium-functionalized resin. Following this step, the crosslinked resin composition can be adjusted by pH such that the pH value of the resin can be about 2 to about 4.5, about 2.2 to about 4.2, about 2.5 to about 4, or about 2.7 to about 3.7. This pH adjustment step can also be followed by the step of adjusting the solids content, by weight, of the resin composition of about 10% to about 50% to form the crosslinked resin. For example, the solids content of the resin can be adjusted from about 15% to about 40% or about 20% to about 30% to form the crosslinked resin. In some examples, the crosslinked resin can have a solids content of about 25%.

The solids or non-volatiles content of any of the compounds or resins discussed and described herein, such as the crosslinked resin or the functionalized crosslinked resin, can be measured by determining the weight loss upon heating a small sample, e.g., about 5-8 grams of the sample, to a suitable temperature, e.g., 105° C., for a time sufficient to remove the liquid medium therefrom. By measuring the weight of the sample before and after heating, the amount of the solids or non-volatiles in the sample can be directly calculated or otherwise estimated. It should be noted that the temperature necessary to remove the liquid medium can depend, at least in part, on the particular liquid medium(s) present in the adhesive.

A variety of precursors that can be used to produce the functionalized crosslinked resin can include polyamines, polyamidoamines, crosslinked resins, various polyamide-epihalohydrin (PAE) polymers, precursors thereof, and other compounds. Suitable methods for preparing these precursors can include those discussed and described in U.S. Pat. Nos. 2,926,116; 3,058,873; 3,772,076; 5,338,807; 5,567,798; 5,585,456, and 8,246,781; U.S. Publication Nos.: 2012/0064323; 2014/0020858; and 2014/0166223; EP Patent No.: EP 0488767; Canadian Publication No.: CA 979,579; and GB Publication No.: GB 865,727(A). Suitable commercially available PAE resins can include, but are not limited to, AMRES® resins available from Georgia-Pacific Chemicals LLC, KYMENE® resins available from Ashland-Hercules, and FENNOSTRENGTH®, resins available from Kemira.

Release Aid

The creping adhesive can include or be used in conjunction with one or more release aids, also referred to as release agents, and can be applied to a thermal drum dryer, such as a Yankee dryer. The weight ratio between creping adhesive and release aid can range from about 10:90 to about 1,000:1.

In some examples, the release aid can be or include one or more quaternized imidazoline compounds (e.g., methyl and ethyl sulfate salts of quaternary imidazoline derived from fatty acids), one or more mineral oils, one or more vegetable oils, or any mixture thereof. Alternatively, the release aid can be an oil-based dispersion of paraffinic oil, naphthenic oil, a vegetable oil or a blend thereof. The imidazoline-based release aid itself can have an adjustable viscosity, which can be varied by using a mixture of high boiling compounds as a solvent for the quaternized imidazoline.

The quaternary imidazoline release aid can be typically supplied as a mixture containing about 90 wt % of imidazoline and about 10 wt % of diethylene glycol, which then can be dissolved in a high boiling point solvent. For example, about 20 wt % to about 80 wt % of the quaternary imidazoline can be dissolved in one or more solvents. The solvent can be a mixture of (a) polyethylene glycol, having a weight average molecular weight ($M_w$) of about 200 to about 600 (about 20 wt % to about 40 wt % of the solvent), (b) polyethylene glycol monooleate (with 9 units of ethylene oxide) (about 10 wt % to about 40 wt % of the solvent), (c) propylene glycol (about 0 wt % to about 20 wt % of the solvent), (d) triethanolamine (about 0 wt % to about 15 wt % of the solvent), and (e) diamidoamine (about 0 wt % to about 7 wt % of the solvent). Alternatively, the surfactant choice for the release aid can also be a mixture of PEG 400 dioleate, PEG 600 dioleate, mineral oil and/or vegetable oil. Additionally, other secondary amines, such as diethanolamine and monoethanolamine, also can be included with the release aid.

In other examples, the quaternary imidazoline release aid can also be used in conjunction with oil based release aids to permit further flexibility in controlling the creping process. The imidazoline release aids can be used to control the thermosetting process of the functionalized crosslinked resin. Such low molecular weight compounds with a secondary or tertiary amine group are water soluble and compatible with the creping adhesive. For example, quaternized imidazoline can be a major component of a release aid currently supplied by the assignee of the present application. During the quaternization of the imidazoline, the unreacted amidoamine can be also converted to a tertiary amine. During the creping process, such as on a Yankee dryer, the temperature of the dryer surface reaches about 100° C. to about 105° C. At such temperature, and in the presence of water, the derivatives of imidazoline can hydrolyze yielding reactive amine functionality that then serve as reactive modifiers.

The creping adhesive can also be used in conjunction with conventional release aids and other modifiers for the Yankee dryer coating. Such release aids can include oil-based release aids or the plasticizer-based release aids are discussed and described in U.S. Pat. Nos. 5,660,687 and 5,833,806. A release aid such as silicone oil, other oils, surfactants, soaps, shampoos, or conventional additives for creping adhesive or other adhesives, can either be applied between the dryer and the web, or, for example, mixed with the creping adhesive, to limit the extent of adhesion. Other release aids, humectants, or plasticizers which modify adhesion of the web to the drying surface, can also be used in conjunction with the creping adhesive. The release aids can include water soluble polyols, glycols, glycerol, sorbitol, polyglycerin, polyethylene glycols, sugars, oligosaccharides, hydrocarbon oils and blends.

The properties of the creping adhesive also can be varied, as desired, by means of certain additional additives. For example, tackifiers, surfactants, dispersants, salts which can be effective to adjust water hardness, acids or bases for adjusting the pH of the composition or other useful additives can be incorporated into the composition, in accordance with common practice in the industry. The pH can be adjusted with any other acids or mixtures of acids used to acidify or otherwise produce the acidified crosslinked resin (O), as discussed above. The acids can be or include one or more mineral acids, one or more organic acids, or any mixture thereof. Illustrative acids can be or include, but are not limited to, one or more of: hydrochloric acid, sulfuric acid, phosphoric acid, one or more organic acids, salts thereof, or any mixture thereof. Additives that can be included with the creping adhesive can be or include polyols, which can serve multiple purposes, such as surfactants, co-solvents, and/or viscosity modifiers. Illustrative polyols can be or include, but are not limited to, glycerol, propylene glycol, ethylene glycol, polyethylene glycol, alkylpolyglucoside (APG), esters thereof, salts thereof, or any mixture thereof.

The creping adhesive can have a cylinder probe adhesion of about 20 gram-force ($g_f$), about 50 $g_f$, about 80 $g_f$, about 100 $g_f$, about 120 $g_f$, about 150 $g_f$, or about 180 $g_f$ to about 200 $g_f$, about 230 $g_f$, about 250 $g_f$, about 280 $g_f$, about 300 $g_f$, about 330 $g_f$, about 350 $g_f$, about 380 $g_f$, about 400 $g_f$, or greater. For example, the creping adhesive can have a cylinder probe adhesion of about 50 $g_f$ to about 250 $g_f$, about 100 $g_f$ to about 250 $g_f$, about 150 $g_f$ to about 250 $g_f$, about 200 $g_f$ to about 250 $g_f$, about 50 $g_f$ to about 300 $g_f$, about 100 $g_f$ to about 300 $g_f$, about 150 $g_f$ to about 300 $g_f$, or about 200 $g_f$ to about 300 $g_f$.

The cylinder probe adhesion is a measure of the adhesive force properties of a polymer or resin subjected to the repeated contact and displacement of a cylinder probe into a heated sample on a metal platen. Measurement of the cylinder probe adhesion is conducted in a constant humidity environment (30%+/−2% Relative Humidity) using a platen heated to a temperature of about 70° C. before applying the adhesive sample. The reported Cylinder Probe Adhesion value is the maximum force measured by the cylinder probe through a series of 30 displacements over a 30 minute period. The force is a measure of the maximum adhesion developed as the sample is concentrated by evaporation over time. The test is conducted using the TA.XT Plus Texture Analyzer, commercially available from Texture Technologies Corp., a heat exchanger module commercially available from Exponent Stable Micro Systems and a round compression probe TA-8, 6.35 mm (0.25 in) diameter, round tip, stainless steel. Texture Expert Exponent Software (Texture Exponent 32 (TEE32)), by Stable Micro Systems, Ltd., is a 32-bit software package which drives the TA.XT Plus Texture Analyzer.

The creping adhesive can have a peel adhesion of about 10 g/cm, about 20 g/cm, about 30 g/cm, about 40 g/cm, or about 50 g/cm to about 60 g/cm, about 70 g/cm, about 80 g/cm, about 90 g/cm, about 100 g/cm, about 110 g/cm, about 120 g/cm, about 130 g/cm, about 140 g/cm, about 150 g/cm, or about 160 g/cm. For example, the creping adhesive can have a peel adhesion of about 10 g/cm to about 120 g/cm, about 20 g/cm to about 120 g/cm, about 20 g/cm to about 110 g/cm, about 20 g/cm to about 100 g/cm, about 20 g/cm to about 90 g/cm, about 20 g/cm to about 80 g/cm, about 20 g/cm to about 70 g/cm, about 30 g/cm to about 120 g/cm, about 30 g/cm to about 110 g/cm, about 30 g/cm to about 100 g/cm, about 30 g/cm to about 90 g/cm, about 30 g/cm to about 80 g/cm, about 30 g/cm to about 70 g/cm, about 50 g/cm to about 120 g/cm, about 50 g/cm to about 110 g/cm, about 50 g/cm to about 100 g/cm, about 50 g/cm to about 90 g/cm, about 50 g/cm to about 80 g/cm, or about 50 g/cm to about 70 g/cm.

The peel adhesion is considered an indicator of tissue web adhesion that will be developed on a Yankee drum dryer. The peel adhesion is measured according to the following procedure. A cloth strip (136 thread count cotton cloth 2.54 cm×25.4 cm (1 in×10 in)) is pressed with a roller onto a steel coupon (platen-Q-lab metal coupons 6.35 cm×25.4 cm (2.5 in×10 in), SAE 1008 cold rolled steel, 0.2-0.3 μm roughness) coated with fixed amount of liquid adhesive applied as a liquid containing about 15% by weight solids. The cotton strip is soaked in deionized water until completely wet and then pressed between blotters to remove excess water. A steel coupon is coated with the adhesive sample using a No. 40 Wire Rod to provide a uniform film. The wet cotton strip is placed on the platen and rolled once with a weighted roll. The platen with the adhered cloth is heated at about 93° C. for about 2 min, and then the strip is peeled (peeled length of about 12.7 cm (about 5 in)) in a perpendicular direction from the steel platen (i.e., at an angle of 90°) at a constant speed of about 60.96 cm/min (about 24 in/min) using a Thwing-Albert tensile tester. The average force required to remove the strip from the platen is measured.

The creping adhesive, at 15 wt % solids, can have a viscosity of about 10 cP, about 20 cP, about 30 cP, about 40 cP, or about 50 cP to about 60 cP, about 80 cP, about 100 cP, about 120 cP, about 150 cP, about 180 cP, about 200 cP, about 220 cP, about 250 cP, about 280 cP, about 300 cP, about 350 cP, about 400 cP, about 450 cP, about 500 cP, or greater at a temperature of about 25° C. For example, the creping adhesive, at 15 wt % solids, can have a viscosity of about 10 cP to about 500 cP, about 10 cP to about 400 cP, about 10 cP to about 350 cP, about 10 cP to about 300 cP, about 10 cP to about 280 cP, about 10 cP to about 250 cP, about 10 cP to about 220 cP, about 10 cP to about 200 cP, about 10 cP to about 180 cP, about 10 cP to about 150 cP, about 10 cP to about 120 cP, about 10 cP to about 100 cP, about 10 cP to about 80 cP, about 10 cP to about 60 cP, about 10 cP to about 50 cP, about 10 cP to about 40 cP, about 20 cP to about 400 cP, about 20 cP to about 350 cP, about 20 cP to about 300 cP, about 20 cP to about 280 cP, about 20 cP to about 250 cP, about 20 cP to about 220 cP, about 20 cP to about 200 cP, about 20 cP to about 180 cP, about 20 cP to about 150 cP, about 20 cP to about 120 cP, about 20 cP to about 100 cP, about 20 cP to about 80 cP, about 20 cP to about 60 cP, about 20 cP to about 50 cP, about 20 cP to about 40 cP, about 50 cP to about 500 cP, about 50 cP to about 400 cP, about 50 cP to about 350 cP, about 50 cP to about 300 cP, about 50 cP to about 280 cP, about 50 cP to about 250 cP, about 50 cP to about 220 cP, about 50 cP to about 200 cP, about 50 cP to about 180 cP, about 50 cP to about 150 cP, about 50 cP to about 120 cP, about 50 cP to about 100 cP, about 50 cP to about 500 cP, about 50 cP to about 80 cP, or about 50 cP to about 60 cP at a temperature of about 25° C.

The creping adhesive can be applied to the dryer surface at a rate, relative to the rate of dryer surface rotation, which provides an adequate amount of adhesive to hold the web during drying yet release the dried web upon completion of drying. The application rates of the creping adhesive on the dryer surface can be about 0.01 mg/m$^2$, about 0.03 mg/m$^2$, about 0.05 mg/m$^2$, about 0.07 mg/m$^2$, about 0.09 mg/m$^2$, about 0.1 mg/m$^2$, about 0.3 mg/m$^2$, about 0.5 mg/m$^2$, about 0.7 mg/m$^2$, about 0.9 mg/m$^2$, about 1 mg/m$^2$, about 3 mg/m$^2$, about 5 mg/m$^2$, about 7 mg/m$^2$, about 9 mg/m$^2$, or about 10 mg/m$^2$ to about 12 mg/m$^2$, about 15 mg/m$^2$, about 18 mg/m$^2$, about 20 mg/m$^2$, about 22 mg/m$^2$, about 25 mg/m$^2$, about 28 mg/m$^2$, about 30 mg/m$^2$, about 35 mg/m$^2$, about 40 mg/m$^2$, about 45 mg/m$^2$, about 50 mg/m$^2$, about 55 mg/m$^2$, about 60 mg/m$^2$, about 65 mg/m$^2$, about 70 mg/m$^2$, about 80 mg/m$^2$, about 90 mg/m$^2$, about 100 mg/m$^2$, about 150 mg/m$^2$, about 200 mg/m$^2$, about 250 mg/m$^2$, about 300 mg/m$^2$, about 350 mg/m$^2$, about 400 mg/m$^2$, about 450 mg/m$^2$, about 500 mg/m$^2$, or greater.

Exemplary application rates of the creping adhesive on the dryer surface can be about 0.01 mg/m$^2$ to about 500 mg/m$^2$, about 0.01 mg/m$^2$ to about 100 mg/m$^2$, or about 0.01 mg/m$^2$ to about 10 mg/m$^2$, based on the solids weight of the creping adhesive are surprisingly effective. In other examples, the application rates of the creping adhesive on the dryer surface can be about 0.5 mg/m$^2$ to about 100 mg/m$^2$, about 1 mg/m$^2$ to about 100 mg/m$^2$, about 3 mg/m$^2$ to about 100 mg/m$^2$, about 5 mg/m$^2$ to about 100 mg/m$^2$, about 10 mg/m$^2$ to about 100 mg/m$^2$, about 15 mg/m$^2$ to about 100 mg/m$^2$, about 20 mg/m$^2$ to about 100 mg/m$^2$, about 25 mg/m$^2$ to about 100 mg/m$^2$, about 0.5 mg/m$^2$ to about 75 mg/m$^2$, about 1 mg/m$^2$ to about 75 mg/m$^2$, about 3 mg/m$^2$ to about 75 mg/m$^2$, about 5 mg/m$^2$ to about 75 mg/m$^2$, about 10 mg/m$^2$ to about 75 mg/m$^2$, about 15 mg/m$^2$ to about 75 mg/m$^2$, about 20 mg/m$^2$ to about 75 mg/m$^2$, about 25 mg/m$^2$ to about 75 mg/m$^2$, about 0.5 mg/m$^2$ to about 50 mg/m$^2$, about 1 mg/m$^2$ to about 50 mg/m$^2$, about 3 mg/m$^2$ to about 50 mg/m$^2$, about 5 mg/m$^2$ to about 50 mg/m$^2$, about 10 mg/m$^2$ to about 50 mg/m$^2$, about 15 mg/m$^2$ to about 50 mg/m$^2$, about 20 mg/m$^2$ to about 50 mg/m$^2$, about 25 mg/m$^2$ to about 50 mg/m$^2$, about 0.5 mg/m$^2$ to about 30 mg/m$^2$, about 1 mg/m$^2$ to about 30 mg/m$^2$, about 3 mg/m$^2$ to about 30 mg/m$^2$, about 5 mg/m$^2$ to about 30 mg/m$^2$, about 10 mg/m$^2$ to about 30 mg/m$^2$, about 15 mg/m$^2$ to about 30 mg/m$^2$, about 20 mg/m$^2$ to about 30 mg/m$^2$, about 25 mg/m$^2$ to about 30 mg/m$^2$, about 0.5 mg/m$^2$ to about 20 mg/m$^2$, about 1 mg/m$^2$ to about 20 mg/m$^2$, about 3 mg/m$^2$ to about 20 mg/m$^2$, about 5 mg/m$^2$ to about 20 mg/m$^2$, about 10 mg/m$^2$ to about 20 mg/m$^2$, about 15 mg/m$^2$ to about 20 mg/m$^2$, about 0.5 mg/m$^2$ to about 10 mg/m$^2$, about 1 mg/m$^2$ to about 10 mg/m$^2$, about 3 mg/m$^2$ to about 10 mg/m$^2$, about 5 mg/m$^2$ to about 10 mg/m$^2$. Indeed, the creping adhesive can exhibit good adhesion and creping performance at very low add-on rates, i.e., application rates of the creping adhesive on the dryer surface between 0.01 mg/m$^2$ to about 2.0 mg/m$^2$. The creping adhesive can be continuously applied to the rotating dryer so that an adequate amount of adhesive can be always on the dryer surface.

One or more phosphate compounds such as phosphoric acid or phosphate salts also can be added to the composition to improve the flowability and wetting properties of the creping adhesive on the Yankee dryer and to reduce the hard film build-up on the creping surface of the Yankee dryer. The addition of phosphoric acid or phosphate salts also has the effect of promoting the anti-corrosion property of the creping adhesive. If a phosphate additive is used, the amount can be about 5 wt % to about 25 wt %, based on the total weight of the creping adhesive.

Fibrous webs can be creped using the creping adhesive by applying the creping adhesive described above to a drying surface for the web or to the web; pressing the fibrous web against the drying surface to effect adhesion of the web to the drying surface; and dislodging the web from the drying surfaces with a creping device such as a creping blade to crepe the fibrous web. The web can be or include a fibrous web and/or a cellulosic web.

EXAMPLES

In order to provide a better understanding of the foregoing discussion, the following non-limiting examples are offered. Although the examples can be directed to specific embodiments, they are not to be viewed as limiting the invention in any specific respect.

The number average molecular weight ($M_n$), the weight average molecular weight ($M_w$), and the z-average molecular weight ($M_z$) was determined for the resins and/or polymers discussed and described herein. The $M_n$ is the arithmetic mean or average of the molecular masses or weights of the individual macromolecules of the polymer or resin. The $M_w$ is also the arithmetic mean or average of the molecular masses or weights of the individual macromolecules of the polymer or resin, but takes into account the molecular mass or weight of a chain in determining contributions to the molecular weight average. The $M_z$ is the third moment or third power average molar mass or weight. The $M_n$, the $M_w$, and the $M_z$ were measured using gel permeation chromatography ("GPC"), also known as size exclusion chromatography ("SEC"). This technique utilized an instrument containing columns packed with porous beads, an elution solvent, and detector in order to separate polymer molecules of different sizes.

The cylinder probe adhesion values listed in Tables 2-4 below are those of the maximum force and are in units of gram-force ($g_f$). The peel adhesion values listed in Tables 4-6 below are in units of grams/centimeter (g/cm). For the reported peel adhesion values, ten (10) individual peel measurements are made and the average (Mean Peel Adhesion) is reported.

Example 1: Prepolymer

A glass reactor with a 5-neck top was equipped with a stainless steel stirring shaft, a reflux condenser, temperature probe, and a hot oil bath for heating. To the reactor was added about 500.5 g of diethylenetriamine (DETA). The agitator was turned on and about 730 g of adipic acid was added slowly over about 45 min with stirring. The reaction temperature increased from about 25° C. to about 145° C. during adipic acid addition. After the adipic acid was added, the reactor was immersed in a hot oil bath heated to about 170° C. At about 150° C. the reaction mixture began to reflux. The reflux condenser was reconfigured for distillation and distillate was collected in a separate receiver. During the reaction period and until the desired viscosity end-point, the temperature of the reaction mixture was gradually heated to about 165° C. The reaction was sampled at intervals of about 30 min to monitor the advancement of viscosity. Each neat resin sample was diluted to about 45 wt % solids with water, cooled to about 25° C., and the viscosity was measured with Brookfield viscometer. Once the reaction mixture had a viscosity of about 290 cP, the distillation condenser was reconfigured to reflux. Water was added slowly to the reaction mixture through the reflux condenser to dilute and cool the reaction. Water was added to obtain a final non-volatile content of about 45 wt % solids. The viscosity of Ex. 1 prepolymer was about 290 cP at a temperature of about 25° C.

Example 2: Prepolymer

A glass reactor with a 5-neck top was equipped with a stainless steel stirring shaft, a reflux condenser, temperature probe, and a hot oil bath for heating. To the reactor was added about 1,574.5 g of dibasic ester-5 (also known as DBE-5) that contained dimethyl glutarate. The agitator was turned on and about 1,038.9 g of DETA was added with stirring. The reactor was immersed in a hot oil bath heated to about 100° C. At about 90° C. the reaction mixture began to reflux. The reflux condenser was reconfigured for distillation and distillate was collected in a separate receiver. During the reaction period and until the desired viscosity end-point, the temperature of the reaction mixture was gradually heated to about 135° C. The reaction was sampled at intervals of about 30 min to monitor the advancement of viscosity. Each neat resin sample was diluted to about 50 wt % solids with water, cooled to about 25° C., and the viscosity was measured with a Brookfield viscometer. Once the reaction mixture had a viscosity of about 350 cP (diluted sample), the distillation condenser was reconfigured to reflux. Water was added slowly to the reaction mixture through the reflux condenser to dilute and cool the reaction. Water was added to obtain a non-volatile content of about 50 wt % solids. The viscosity of Ex. 2 prepolymer was about 350 cP at a temperature of about 25° C.

Example 3: Prepolymer

A glass reactor with a 5-neck top was equipped with a stainless steel stirring shaft, a reflux condenser, temperature probe, and a hot oil bath for heating. To the reactor was added about 1,574.5 g of DBE-5. The agitator was turned on and about 1,038.9 g of DETA was added with stirring. The reactor was immersed in a hot oil bath heated to about 100° C. At about 90° C. the reaction mixture began to reflux. The reflux condenser was reconfigured for distillation and distillate was collected in a separate receiver. During the reaction period and until the desired viscosity end-point, the temperature of the reaction mixture was gradually heated to about 135° C. The reaction was sampled at intervals of about 30 min to monitor the advancement of viscosity. Each neat resin sample was diluted to 45 wt % solids with water, cooled to about 25° C., and the viscosity was measured with a Brookfield viscometer. Once the reaction mixture had a viscosity of about 290 cP, the distillation condenser was reconfigured to reflux. Water was added slowly to the reaction mixture through the reflux condenser to dilute and cool the reaction. Water was added to obtain a non-volatile content of about 45 wt %. The viscosity of Ex. 3 prepolymer was about 290 cP at a temperature of about 25° C.

Examples 4-6: Crosslinked Resin Produced from the Ex. 1 Prepolymer and MBA

A 1 L glass reactor with a 5-neck top was equipped with a glass stirring shaft and a TEFLON® paddle, a variable temperature heating mantle, a temperature probe, and stainless steel cooling coils. To the reactor was added about 600 g of the Ex. 1 prepolymer. The Ex. 1 prepolymer was heated to about 60° C. and solid methylene-bis-acrylamide (MBA, commercially available from Pfaltz & Bauer, Inc.) was added to the heated prepolymer over about 3-6 hr in aliquots totaling the amounts shown for each of the Exs. 4-6 in Table 1 (1, 3, and 5 aliquots, respectively). The viscosity of each reaction was sampled over about 3-6 hr while heating at about 60° C. until no further advancement was observed. The final, undiluted viscosities for Exs. 4-6 were about 739 cP, about 982 cP, and about 2,474 cP, respectively, at a temperature of about 25° C. Water was added to adjust each Ex. 4-6 to about 15 wt % solids. Each Ex. 4-6 was tested to provide the properties listed in Table 1.

TABLE 1

MBA added to Ex. 1 prepolymer @ 45 wt % solids

| EX. | MBA (wt %) | MBA/Prepolymer Mole Ratio | Viscosity (cP) | Mn | Mw | Mz |
|---|---|---|---|---|---|---|
| 4 | 1.980 | 0.0273 | 11.3 | 42,200 | 85,600 | 195,000 |
| 5 | 2.437 | 0.0337 | 13.0 | 47,200 | 115,000 | 355,000 |
| 6 | 3.118 | 0.0431 | 26.5 | 46,800 | 301,000 | 2,450,000 |

Examples 7-10: Crosslinked Resin Produced from the Ex. 2 Prepolymer and MBA

A 250 mL 3-neck round-bottom glass reactor was equipped with a glass stirring shaft and a TEFLON® paddle, a variable temperature heating mantle, and a temperature probe. To the reactor was added about 500 g of the Ex. 2 prepolymer, followed by an aqueous solution of MBA (about 3.3 wt % of MBA, remainder water; commercially available from Pfaltz & Bauer, Inc.). For Exs. 7-10, the weight percent (wt %) of MBA solids to Prepolymer solids, and the MBA/Prepolymer Mole Ratio are listed in Table 2. To each reaction mixture of Exs. 7-10, water was added to adjust the total reaction concentration (prepolymer solids+MBA solids) to about 20 wt %. Each reaction mixture was heated to about 50° C. and held for about 6-10 hr until no further viscosity advancement was observed. The final, undiluted viscosities for Exs. 7-10 were about 21.2 cP, about 37 cP, about 87.3 cP, and about 357 cP, respectively, at a temperature of about 25° C. Water was added to adjust each Ex. 7-10 to about 15 wt % solids. Each Ex. 7-10 was tested to provide the properties listed in Table 2.

TABLE 2

MBA Added to Ex. 2 prepolymer @ 20% Reaction Solids

| EX. | MBA (wt %) | MBA/Prepolymer Mole Ratio | Final Visc @ 15 wt % solids (cP) | Cylinder Probe Adhesion ($g_f$) |
|---|---|---|---|---|
| 7 | 5.60 | 0.0724 | 10.3 | 254 |
| 8 | 7.00 | 0.0905 | 17.5 | 224 |
| 9 | 8.00 | 0.1034 | 37.4 | 185 |
| 10 | 8.25 | 0.1066 | 140 | 148 |

Examples 11-16 and CE 1-3: Crosslinked Resin Produced from the Ex. 2 Prepolymer and MBA A 250 mL 3-neck round-bottom glass reactor was equipped with a glass stirring shaft and a TEFLON® paddle, a variable temperature heating mantle, and a temperature probe. To the reactor was about 550 g of the Ex. 1 prepolymer, followed by an aqueous solution of MBA (about 3.3 wt % of MBA, remainder water; commercially available from Pfaltz & Bauer, Inc.). For Exs. 4 and 11-16, the weight percent (wt %) of MBA solids to Prepolymer solids, and the MBA/Prepolymer Mole Ratio are listed in Table 3. To each reaction mixture water was added to adjust the total solids concentration (prepolymer solids+MBA solids) of about 19.6 wt % to about 20 wt %. Each reaction mixture was heated to about 60° C. and held for about 6-10 hr until no further viscosity advancement was observed. The final, undiluted viscosity at a temperature of about 25° C. of Exs. 11-15 was about 28.3 cP, about 38.8 cP, about 50.6 cP, about 243 cP, about 257 cP, respectively. Ex. 16 gelled after about 5 hr at about 60° C. Water was then added to adjust each of the Exs. 11-15 to about 15 wt % solids to provide the properties in Table 3. Comparative Exs. 1-3 (CE1, CE2, and CE3) were NAVIGATOR®—A, B, and C creping adhesives, respectively, commercially available from Georgia-Pacific Chemicals LLC. The cylinder probe adhesion values for CE1-CE3 were determined as listed in Table 3.

TABLE 3

MBA 3.3% Solution added to Ex. 1 prepolymer @ 15% Reaction Conc. Compared to Commercial Navigator ® Creping Adhesives

| EX. | MBA (wt %) | MBA/Prepolymer Mole Ratio | Final Visc @ 15 wt % solids (cP) | Cylinder Probe Adhesion ($g_f$) |
|---|---|---|---|---|
| 4 | 1.98 | 0.0273 | 11.3 | 248 |
| 11 | 4.00 | 0.0553 | 13.8 | 201 |
| 12 | 4.50 | 0.0622 | 19.5 | 184 |
| 13 | 5.00 | 0.0692 | 28 | 171 |
| 14 | 5.50 | 0.0761 | 98 | 118 |
| 15 | 5.60 | 0.0775 | 103 | 111 |
| 16 | 5.75 | 0.0795 | gel | — |
| CE1 | | | | 212 |
| CE2 | | | | 154 |
| CE3 | | | | 116 |

Examples 17-22 and CE 1-3: Crosslinked Resin Produced from the Ex. 3 Prepolymer and MBA A 2 L glass reactor with a 5-neck top was equipped with a glass stirring shaft and a TEFLON® paddle, a variable temperature heating mantle, a temperature probe, stainless steel cooling coils, and a vacuum sampling tube. To the reactor was added about 550 g of the Ex. 3 prepolymer. To each reaction example, water was added to adjust the total reaction concentration (prepolymer solids+MBA solids) to about 17.5 wt %. To each reaction example solid MBA (commercially available from Pfaltz & Bauer, Inc.) was added in multiple aliquots over about 5-10 hr while maintaining a reaction temperature of about 60° C. to give the total amounts of MBA given in Table 4. After the total amounts of MBA had been added, each reaction example was heated at about 60° C. until no further viscosity advancement was observed. Water was then added to adjust each of the Exs. 17-20 and 22 to about 15 wt % solids. Ex. 21 was prepared from an aliquot of Ex. 20 that was adjusted to a pH of about 7 with 37 wt % hydrochloric acid, followed by dilution with water to yield an adhesive with a total solids content of about 15 wt %.

Examples 23-25: Crosslinked Resin Produced from the Ex. 3 Prepolymer and MBA

A 2 L glass reactor with a 5-neck top was equipped with a glass stirring shaft and a TEFLON® paddle, a variable temperature heating mantle, a temperature probe, stainless steel cooling coils, and a vacuum sampling tube. To the reactor was added about 600 g of Ex. 3 prepolymer. To this prepolymer was added about 993.2 g of water. The reaction mixture was heated to about 30° C., and an initial quantity of about 8.93 g of solid MBA (commercially available from Pfaltz & Bauer, Inc.) was added at once with stirring. After holding at about 30° C. for about 10 min the reaction mixture was heated to about 60° C. over about 20 min. The reaction mixture was sampled about every 15 min over about 2 hr using a Brookfield LV-DV II+ viscometer equipped with a small sample adapter cup at a temperature of about 25° C. The viscosity increased from about 7 cP to about 14 cP over about 2 hr. Over the next 11 hr, a total of about 8.1 g of solid MBA was added in 6 aliquots to provide a reaction mixture with a final viscosity of about 109 cP at a temperature of about 25° C. Before each aliquot of MBA was added, the reaction mixture was cooled from about 60° C. to about 30° C. After each aliquot of MBA was added, the reaction was heated back to about 60° C. and was sampled about every 15 min until the viscosity showed no further advancement after three consecutively measured samples. After the reaction viscosity advancement stalled, the reaction was again cooled to about 30° C. and the next aliquot of MBA was added. A total of about 17.03 g of solid MBA was added to achieve a final reaction viscosity of about 109 cP at a temperature of about 25° C. The pH of the reaction mixture was about 9.58. The reaction mixture was cooled to about 25° C. and was split into three equal portions (Exs. 23-25). Ex. 23 portion was adjusted to about 15.03 wt % solids by the addition of water, and gave a viscosity of about 63.6 cP by Brookfield viscometer. Ex. 24 portion was adjusted to pH of about 7.03 with 85 wt % phosphoric acid, followed by dilution with water to yield an adhesive with a viscosity of about 47 cP at about 14.76% final solids. Ex. 25 portion was adjusted to pH of about 7 with 37 wt % hydrochloric acid, followed by dilution with water to yield an adhesive with a viscosity of about 46 cP at about 14.35% final solids. The viscosity at 15 wt % solids, the intrinsic viscosity, the $M_w$, the $M_z$, the $T_g$, the peel adhesion value, and the cylinder probe adhesion value for the products made in Exs. 23-25 were determined as listed in Table 4.

Examples 26-31: Crosslinked Resin Produced from the Ex. 3 Prepolymer and PPG-DGE A 1 L glass reactor with a 5-neck top was equipped with a glass stirring shaft and a TEFLON® paddle, a variable temperature heating mantle, a temperature probe, stainless steel cooling coils, and a vacuum sampling tube. To the reactor was added about 400 g of Ex. 3 prepolymer. To this prepolymer was added about 692.3 g of water. The reaction mixture was heated to about 30° C., and an initial quantity of about 12.35 g of liquid poly(propyleneglycol) diglycidyl ether (PPG-DGE, 100%, commercially available from Cargill, Inc.) was added dropwise via a syringe pump with stirring. After holding at about 30° C. for about 10 min the reaction mixture was heated to about 60° C. over about 20 min. The reaction mixture was sampled about every 15 min over about 1.5 hr using a Brookfield LV-DV II+ viscometer equipped with a small sample adapter cup at a temperature of about 25° C. The viscosity increased from about 7 cP to about 11 cP over about 1.5 hr. Over the next 10 hr, a total of about 24.18 g of PPG-DGE was added in 6 aliquots to provide a reaction mixture with a viscosity of about 65.6 cP at a temperature of about 25° C. Before each aliquot of PPG-DGE was added, the reaction mixture was cooled from about 60° C. to about 30° C. After each aliquot of PPG-DGE was added, the reaction was heated back to about 60° C. and was sampled about every 15 min until the viscosity showed no further advancement after three consecutively measured samples. After the reaction viscosity advancement stalled, the reaction was again cooled to about 30° C. and the next aliquot of PPG-DGE was added. A total of about 36.53 g of PPG-DGE was added to achieve a viscosity of about 65.6 cP at a temperature of about 25° C. The pH of the reaction mixture was about 9.64. The reaction mixture was cooled to about 25° C. About 300 g of the reaction mixture was removed from the reactor and was split into three equal portions (Exs. 26-28). Ex. 26 portion was diluted with water to provide an adhesive with a viscosity of about 14.86 wt % solids, pH of about 9.64, and a viscosity of about 30.7 cP at a temperature of about 25° C. Ex. 27 portion was adjusted to pH of about 7 with 85 wt % phosphoric acid, followed by dilution with water to yield an adhesive with a viscosity of about 30.2 cP at about 14.89 wt % solids and at a temperature of about 25° C. Ex. 28 portion was adjusted to pH of about 7.07 with 37 wt % hydrochloric acid, followed by dilution with water to yield an adhesive with a viscosity of about 27.7 cP at 15 wt % solids and at a temperature of about 25° C.

The remaining reaction mixture, about 829 g at about 65.6 cP at a temperature of about 25° C., was treated with a total of about 1.52 g of PPG-DGE added in four aliquots over about 10 hr, following the cooling/heating cycle described previously with each addition of PPG-DGE. In this case the reaction mixture was heated to about 50° C. (instead of about 60° C. as described previously). After the fourth aliquot of PPG-DGE was added and the viscosity advancement had stalled, the reaction mixture had a viscosity of about 114.3 cP at about 20.05 wt % solids and pH of about 9.6. The reaction mixture was split into three equal portions (Exs. 29-31). Ex. 29 portion was diluted with water to provide an adhesive with a viscosity of about 14.86 wt % solids, pH of about 9.7, and a viscosity of about 47.3 cP. Ex. 30 portion was adjusted to pH of about 7.05 with 85 wt % phosphoric acid, followed by dilution with water to yield an adhesive with a viscosity of about 46.4 cP at about 14.89 wt % solids. Ex. 31 portion was adjusted to pH of about 7.2 with 37 wt % hydrochloric acid, followed by dilution with water to yield an adhesive with a viscosity of about 42.8 cP at about 15 wt % solids. The viscosity at 15 wt % solids, the intrinsic viscosity, the $M_w$, the $M_z$, the $T_g$, the peel adhesion value, and the cylinder probe adhesion value for the products made in Exs. 26-31 were determined as listed in Table 4.

TABLE 4

Ex. 3 prepolymer Crosslinked with MBA or PPE-DGE by One-Stage Reaction Compared to Commercial Navigator ® Creping Adhesives

| EX. | Cross linker | Crosslinker/ Prepolymer Mole Ratio | Final Visc @ 15 wt % solids (cP) | Acid | Intrinsic Viscosity (cP) | GPC Mw | GPC Mz | Tg | Peel Adhesion (g/cm) | Cylinder Probe Adhesion (g$_f$) |
|---|---|---|---|---|---|---|---|---|---|---|
| 17 | MBA | 0.0553 | 13.3 | — | 0.3955 | 50,800 | 159,000 | 39 | 33.1 | 223 |
| 18 | MBA | 0.0706 | 22.7 | — | 0.5839 | 115,000 | 686,000 | 43 | 42.9 | 195 |
| 19 | MBA | 0.0758 | 29.8 | — | 0.7142 | 196,000 | 1,710,000 | 43 | 49.2 | 163 |
| 20 | MBA | 0.0843 | 73.4 | — | 1.1282 | 784,000 | 11,500,000 | 40 | 52.8 | 143 |
| 21 (from Ex. 20) | MBA | 0.0843 | — | HCl | 1.1282 | 784,000 | 11,500,000 | — | 100.8 | 187 |
| 22 | MBA | 0.0750 | 30.7 | — | 0.7210 | 192,000 | 1,860,000 | 44 | — | — |
| 23 | MBA | 0.0811 | 63.6 | — | 1.1607 | 1,160,000 | 24,500,000 | 47 | 33.9 | — |
| 24 | MBA | 0.0811 | 47 | H$_3$PO$_4$ | 0.9019 | 1,330,000 | 28,200,000 | 84 | 101.6 | — |
| 25 | MBA | 0.0811 | 46 | HCl | 1.0555 | 1,380,000 | 29,900,000 | 59 | 76.4 | — |
| 26 | PPG-DGE | 0.1143 | 30.7 | — | — | 570,000 | 8,190,000 | 32 | 23.2 | — |
| 27 | PPG-DGE | 0.1143 | 30.2 | H$_3$PO$_4$ | 0.5471 | 630,000 | 10,500,000 | 67 | 82.7 | — |
| 28 | PPG-DGE | 0.1143 | 27.7 | HCl | — | 303,000 | 2,130,000 | 37 | 51.6 | — |
| 29 | PPG-DGE | 0.1329 | 47.3 | — | — | 1,190,000 | 25,300,000 | 25 | 26.4 | — |
| 30 | PPG-DGE | 0.1329 | 46.4 | H$_3$PO$_4$ | 0.7221 | 922,000 | 17,200,000 | 53 | 90.6 | — |
| 31 | PPG-DGE | 0.1329 | 42.8 | HCl | — | 1,420,000 | 32,000,000 | 14 | 53.9 | — |
| CE1 | epi | | | | | | | | 59.8 | 212 |
| CE2 | epi | | | | | | | | 80.3 | 154 |
| CE3 | epi | | | | | | | | 107.1 | 116 |

Example 32

A 2 L glass reactor with a 5-neck top was equipped with a glass stirring shaft and a TEFLON® paddle, a variable temperature heating mantle, a temperature probe, stainless steel cooling coils, and a vacuum sampling tube. To the reactor was added about 550 g of Ex. 3 prepolymer. About 909 g of water was added to the mixture to adjust the total reaction concentration (prepolymer solids+MBA solids) to about 17.5 wt %. The reaction mixture was heated to about 35° C., and about 9.6 g of solid MBA (commercially available from Pfaltz & Bauer, Inc.) was added at once. The reaction mixture was heated at about 60° C. for about 2 hr while sampling the viscosity about every 15 min. After 2 hr, the viscosity was about 17.6 cP and did not continue to advance, and the reaction mixture was cooled to about 25° C. To the reaction mixture was then added about 3.45 g of epichlorohydrin dropwise over about 15 min. The reaction mixture was heated to about 50° C. and the viscosity was sampled about every 15 min for about 5 hr until the viscosity was at about 40 cP. The reaction mixture was cooled to about 25° C. and was diluted to about 15 wt % solids with water.

Examples 33-34

A 1 L glass reactor with a 5-neck top was equipped with a glass stirring shaft and a TEFLON® paddle, a variable temperature heating mantle, a temperature probe, stainless steel cooling coils, and a vacuum sampling tube. To the reactor, about 467.6 g of Ex. 22 adhesive (before dilution at 17.7 wt % solids) and about 81.87 g of water were added and the heated to about 25° C. To this mixture with stirring was added about 0.54 g of epichlorohydrin dropwise over about 15 min. The reaction mixture was heated to about 50° C. The reaction was kept for about 5 hr at about 50° C., at which point the viscosity was about 88.3 cP at a temperature of about 25° C. and there was no further viscosity advancement. The reaction mixture was then cooled to about 25° C. and water was added to adjust the solids content to 14.9%, to provide Ex. 33, with pH of about 9.6, and viscosity of 83.8 cP. Concentrated hydrochloric acid (about 37 wt %) was added to a portion of Ex. 33 to adjust the pH to 7.02. This mixture was then diluted with water to provide Ex. 34, with a solids content of about 15.1 wt %, pH of about 7.16, and viscosity of about 70.6 cP at a temperature of about 25° C.

Examples 35-36

A 1 L glass reactor with a 5-neck top was equipped with a glass stirring shaft and a TEFLON® paddle, a variable temperature heating mantle, a temperature probe, stainless steel cooling coils, and a vacuum sampling tube. To the reactor, about 609.2 g of Ex. 22 adhesive (before dilution at 17.7 wt % solids) and about 105.3 g of water were added and heated to about 25° C. To this mixture with stirring was added about 0.468 g of epichlorohydrin dropwise over about 15 min. The reaction mixture was heated to about 50° C. The reaction was kept for about 5 hr at about 50° C., at which point the viscosity was about 61.4 cP and there was no further viscosity advancement. The reaction mixture was then cooled to about 25° C. and water was added to adjust the solids content to about 14.8%, to provide Example 35, with pH of about 9.55, and viscosity of about 60.4 cP. Concentrated hydrochloric acid (about 37 wt %) was added to a portion of Ex. 35 to adjust the pH to 7.01. This mixture was then diluted with water to provide Ex. 36, with a solids content of about 15 wt %, pH of about 7.17, and viscosity of about 49 cP.

Example 37

A 250 mL 3-neck round-bottom flask was equipped with a glass stirring shaft and a TEFLON® paddle, a cooling water bath, and a temperature probe. To the flask was added about 293.9 g of Ex. 33 adhesive (before dilution at about 15.4 wt % solids). The temperature was adjusted to about 20° C. and 2.15 g of epichlorohydrin was added dropwise over about 15 min with stirring. The reaction was held for about 12 hr at about 20° C., at which point the reaction mixture had gelled.

Example 38

A 500 mL 3-neck round-bottom flask was equipped with a glass stirring shaft and a TEFLON® paddle, a cooling water bath, and a temperature probe. To the flask was added about 216.7 g of Ex. 35 adhesive and the temperature was adjusted to about 20° C. with a cooling water bath. To the mixture was added about 4.87 g of epichlorohydrin dropwise over about 15 min. The mixture was held at about 20° C. for about 6 hr at which point the viscosity was about 64.5 cP. The mixture was treated with concentrated hydrochloric acid (about 37 wt %) to adjust the pH to about 4.25 and the viscosity to about 63.2 cP. The mixture was then diluted with water to about 15.1 wt % solids, a pH of about 4.54, and viscosity of about 48.5 cP at a temperature of about 25° C.

which point the reaction mixture was cooled to about 25° C. The resultant mixture had a solids content of about 17.6 wt %, a pH of about 9.18, and viscosity of about 17.5 cP. The mixture was treated with concentrated hydrochloric acid (about 37 wt %) to adjust the pH to about 7. The mixture was then diluted with water to about 15.1 wt % solids, a pH of about 7.01, and viscosity of about 15 cP at a temperature of about 25° C.

Example 40

A 1 L glass reactor with a 5-neck top was equipped with a glass stirring shaft and a TEFLON® paddle, a variable temperature heating mantle, a temperature probe, stainless steel cooling coils, and a vacuum sampling tube. To the reactor was added about 297.8 g of Ex. 39 adhesive and about 51.83 g of water. The mixture was heated to about 35° C. and about 0.389 g of solid MBA (commercially available from Pfaltz & Bauer, Inc.) was added to the mixture. The mixture was heated to about 60° C. and held for about 5 hr, and the viscosity increased to about 17.3 cP. The mixture was cooled to about 25° C. to provide an adhesive with about 15.3 wt % solids, a pH of about 9.19, and viscosity of about 15.9 cP. The mixture was treated with concentrated hydrochloric acid (about 37 wt %) to adjust the pH to about 7. The mixture was then diluted with water to about 15.15 wt % solids, a pH of about 7.01, and viscosity of about 14.1 cP at a temperature of about 25° C.

TABLE 5

Ex. 3 prepolymer Crosslinked with MBA, further Crosslinked with Epichloroydrin; Two-Stage Reaction

| EX. | Parent Polymer | MBA/Prepolymer Mole Ratio | Epi/MBA-Poly Mole Ratio | Final Visc @ 15 wt % solids (cP) | Acid | Intrinsic Viscosity | GPC Mw | Peel Adhesion (g/cm) | Tg |
|---|---|---|---|---|---|---|---|---|---|
| 32 | MBA in situ | 0.0500 | 0.0300 | 26 | — | 0.7233 | 174,000 | 45.7 | 42 |
| 33 | 22 | 0.0750 | 0.0150 | 83.8 | — | 1.3293 | 883,000 |  | 44 |
| 34 | 33 |  |  | 70.6 | HCl |  | 876,000 | 98.4 | 56 |
| 35 | 22 | 0.0750 | 0.0100 | 60.4 | — | 1.4145 | — |  |  |
| 36 | 35 |  |  |  | HCl | 1.1062 | 854,000 | 94.9 | 52 |
| 37 | 33 | 0.0750 | 0.0150 | gel |  |  |  |  |  |
| 38 | 35 | 0.0750 | 0.0100 | 48.5 | — | 0.9321 | 1,060,000 | 97.6 | 67 | temperature of about 25° C.

Example 39

A 1 L glass reactor with a 5-neck top was equipped with a glass stirring shaft and a TEFLON® paddle, a variable temperature heating mantle, a temperature probe, stainless steel cooling coils, and a vacuum sampling tube. To the reactor was added about 400 g of Ex. 3 prepolymer and about 663.3 g of water. The reaction mixture was heated to about 25° C. and about 6.52 g of epichlorohydrin was added dropwise over about 10 min. The reaction mixture was kept at a temperature of about 25° C. for about 30 min, then heated at about 50° C. for about 6 hr. The reaction viscosity advancement stalled at about 17.5 cP after about 6 hr, at

TABLE 6

Ex. 3 prepolymer Crosslinked with Epichloroydrin, then Crosslinked with MBA; Two-Stage Reaction

| EX | Parent Polymer | Epi/Prepoly Mole Ratio | MBA/Epi-Poly Mole Ratio | Final Visc @ 15 wt % solids (cP) | Acid | Intrinsic Viscosity | GPC Mw | Peel Adhesion (g/cm) | Tg |
|---|---|---|---|---|---|---|---|---|---|
| 39 |  | 0.0750 | — | 15 | HCl | 0.3974 | 92,300 | 62.2 | 43 |
| 40 | 39 | 0.0750 | 0.0100 | 15.9 | HCl | 0.4635 | 146,000 | 69.7 | 39 |

Example 41

A 1 L glass reactor with a 5-neck top was equipped with a glass stirring shaft and a TEFLON® paddle, a variable temperature heating mantle, a temperature probe, stainless steel cooling coils, and a vacuum sampling tube. To the reactor was added about 700 g of Ex. 3 prepolymer and about 1,190.68 g of water. The reaction mixture was heated to about 30° C. and 17.63 g of solid methylene-bis-acrylamide (MBA, Pfaltz & Bauer Inc.) was added. The reaction mixture was heated to about 50° C. and held for about 9 hr, and the viscosity increased to about 80.4 cP. The reaction mixture was cooled to about 25° C. to provide an adhesive with about 17.7 wt % solids, a pH of about 9.55, and viscosity of about 80.4 cP. Water was added to dilute this non-acidified adhesive to a final concentration of about 14.94 wt % solids, a pH of about 9.57, and viscosity of about 48.8 cP at a temperature of about 25° C. by using a Brookfield small sample adapter viscometer.

Example 42

A 1 L glass reactor with a 5-neck top was equipped with a glass stirring shaft and a TEFLON® paddle, a variable temperature heating mantle, a temperature probe, stainless steel cooling coils, and a vacuum sampling tube. To the reactor was added about 511.48 g of Ex. 41 adhesive at about 14.94 wt % solids. This polymer mixture was heated to about 30° C., and 5.77 g of Epichlorohydrin was added dropwise over dropwise over about 5 min. The reaction mixture was allowed to exotherm to about 43° C. over about 25 min, at which time the viscosity was about 49.3 cP (tested at a temperature of about 25° C.). After about 15 min the viscosity was 57.4 cP (tested at a temperature of about 25° C.), and the reaction mixture was cooled to a temperature of about 35° C. After about an additional 15 min, the reaction mixture was cooled to about 25° C. and the viscosity was 77.4 cP (tested at a temperature of about 25° C.). After about an additional 6 min, at a temperature of about 25° C., the viscosity was about 87 cP and the pH was about 9.40, at which point, about 28.49 g of 85% phosphoric acid was added over a period of about 45 min to adjust the pH of the reaction mixture to about 5.16. The viscosity of the resulting stabilized reaction mixture was about 116 cP at a temperature of about 25° C. by using a Brookfield small sample adapter viscometer. Water was added to the stabilized reaction mixture to adjust the concentration to about 14.91 wt % solids. The viscosity of the adhesive solution was about 60.5 cP at a temperature of about 25° C., and the pH was about 5.42. The total chloride content and the ionic chloride content of the adhesive solution were determined by silver nitrate titration. The total chloride content was about 0.2909 wt % and the ionic chloride content was about 0.0694 wt %, based on the total weight of the adhesive solution. By subtracting the ionic chloride content from the total chloride content, the covalent chloride content, which is equal to the pendant chlorohydrin content, of the adhesive solution was calculated to be about 0.2215 wt %, based on the total weight of the adhesive solution.

Example 43

A 1 L glass reactor with a 5-neck top was equipped with a glass stirring shaft and a TEFLON® paddle, a variable temperature heating mantle, a temperature probe, stainless steel cooling coils, and a vacuum sampling tube. To the reactor was added 530.13 g of Ex. 41 adhesive at about 14.94 wt % solids. This polymer mixture was heated to about 30° C., and about 10.48 g of epichlorohydrin was added dropwise over dropwise over about 5 min. The reaction mixture was allowed to exotherm to about 35° C. over about 25 min, at which time the viscosity was about 46.3 cP (tested at a temperature of about 25° C.). After about 15 min, the viscosity was unchanged and the reaction mixture was heated to about 40° C. After about an additional 30 min, the reaction mixture was cooled to about 25° C. and the viscosity was about 80.9 cP (tested at a temperature of about 25° C.). After about an additional 40 min, at a temperature of about 25° C., the viscosity was about 130 cP and the pH was about 9.11, at which point, about 59 g of water was added at once, followed by about 35.98 g of 85% phosphoric acid added over a period of about 15 min to adjust the pH of the reaction mixture to about 5.09. The viscosity of the resulting stabilized reaction mixture was about 140 cP at a temperature of about 25° C. by using a Brookfield small sample adapter viscometer. Water was added to adjust the concentration to about 15.01 wt % solids. The viscosity of the adhesive solution was about 78.7 cP and the pH was about 5.19 at a temperature of about 25° C. The total chloride content and the ionic chloride content of the adhesive solution were determined by silver nitrate titration. The total chloride content was about 0.4870 wt % and the ionic chloride content was about 0.0118 wt %, based on the total weight of the adhesive solution. By subtracting the ionic chloride content from the total chloride content, the covalent chloride content, which is equal to the pendant chlorohydrin content, of the adhesive solution was calculated to be about 0.4752 wt %, based on the total weight of the adhesive solution.

TABLE 7

Ex. 3 prepolymer Crosslinked with MBA, then Crosslinked with Epichloroydrin;
Two-Stage Reaction; Acid Quenched - Reactivity

| EX | Parent Polymer | MBA/Prepoly Mole Ratio | Epi/MBA-Epi-Poly Mole Ratio | Final Visc @ 15 wt % solids (cP) | Acid | pendant chlorohydrin content (wt %) | Azet Ratio | Peel Adhesion (g/cm) | Tg |
|---|---|---|---|---|---|---|---|---|---|
| 41 |    | 0.0720 | —      | 49 | —         | 0      | 0    | 89  | 43 |
| 42 | 41 | 0.0720 | 0.2000 | 61 | $H_3PO_4$ | 0.2215 | 0.02 | 330 | 39 |
| 43 | 41 | 0.0720 | 0.3500 | 79 | $H_3PO_4$ | 0.4752 | 0.01 | 318 | 80 |

Embodiments of the present disclosure further relate to any one or more of the following paragraphs:

1. A method for making a creping adhesive, comprising reacting a polyamidoamine and a functionally-symmetric crosslinker to produce a partially crosslinked resin, wherein the partially crosslinked resin comprises secondary amines disposed on polyamidoamine backbones crosslinked by primary crosslinking moieties derived from the functionally-symmetric crosslinker; mixing the partially crosslinked resin and a first epihalohydrin to produce a first mixture comprising about 0.005 mol to about 0.5 mol of the first epihalohydrin per mole of the secondary amines; heating the first mixture to a first temperature to produce a crosslinked resin, wherein the crosslinked resin comprises the polyamidoamine backbones crosslinked by the primary crosslinking moieties and crosslinked by propanediyl crosslinking moieties derived from the first epihalohydrin; cooling the crosslinked resin to a second temperature, wherein the second temperature is less than the first temperature; mixing the crosslinked resin at the second temperature with a second epihalohydrin to produce a second mixture comprising about 0.005 mol to about 0.4 mol of the second epihalohydrin per mole of the secondary amines of the crosslinked resin; and reacting the crosslinked resin with the second epihalohydrin to produce a functionalized crosslinked resin, wherein the functionalized crosslinked resin comprises azetidinium moieties and pendent halohydrin moieties disposed on the polyamidoamine backbones crosslinked by the primary crosslinking moieties and the propanediyl crosslinking moieties.

2. The method according to paragraph 1, wherein the crosslinked resin has an azetidinium ratio of less than 0.1.

3. The method according to paragraph 1 or 2, wherein the crosslinked resin has a pendent halohydrin ratio of less than 0.1.

4. The method according to any one of paragraphs 1-3, wherein the functionalized crosslinked resin has an azetidinium ratio of about 0.005 to about 0.12.

5. The method according to any one of paragraphs 1-4, wherein the functionalized crosslinked resin has a pendent halohydrin ratio of about 0.01 to about 0.15.

6. The method according to any one of paragraphs 1-5, wherein the functionalized crosslinked resin has a pendent halohydrin to azetidinium ratio of about 3:1 to about 10:1.

7. The method according to any one of paragraphs 1-6, wherein the first mixture includes about 0.01 mol to about 0.4 mol of the first epihalohydrin per mole of the secondary amines.

8. The method according to any one of paragraphs 1-7, the second mixture includes about 0.01 mol to about 0.3 mol of the second epihalohydrin per mole of the secondary amines of the crosslinked resin.

9. The method according to any one of paragraphs 1-8, wherein the first epihalohydrin and the second epihalohydrin independently comprises epichlorohydrin, epibromohydrin, epiiodohydrin, or any mixture thereof.

10. The method according to any one of paragraphs 1-9, wherein: the polyamidoamine comprises a reaction product of an organic diacid and a polyamine, the organic diacid comprises adipic acid, dimethyl adipate, diethyl adipate, glutaric acid, dimethyl glutarate, diethyl glutarate, salts thereof, esters thereof, hydrates thereof, or any mixture thereof, and the polyamine comprises diethylenetriamine, triethylenetetramine, tetraethylenepentamine, dimethylenetriamine, trimethylenetetramine, tetramethylenepentamine, salts thereof, or any mixture thereof.

11. The method according to any one of paragraphs 1-10, wherein the polyamidoamine comprises adipic moieties or glutaric moieties disposed between polyamine moieties.

12. The method according to any one of paragraphs 1-11, wherein the functionally-symmetric crosslinker comprises N,N'-methylenebisacrylamide, N,N'-methylenebismethacrylamide, poly(ethyleneglycol) diglycidyl ether, poly(propyleneglycol) diglycidyl ether, poly(ethyleneglycol) diacrylate, poly(propyleneglycol) diacrylate, polyazetidinium compounds, isomers thereof, salts thereof, or any mixture thereof.

13. The method according to any one of paragraphs 1-12, wherein the primary crosslinking moiety comprises N,N'-methylenebisacrylamide moieties or glutaric moieties or poly(propyleneglycol) diglycidyl ether moieties.

14. The method according to any one of paragraphs 1-13, wherein the first temperature is equal to or greater than 30° C. to about 100° C., and wherein the second temperature is at about 0° C. to less than 30° C.

15. The method according to any one of paragraphs 1-14, wherein the first temperature is at about 20° C. to about 90° C., and wherein the second temperature is at about 20° C. to about 70° C.

16. A method for making a creping adhesive, comprising reacting a polyamidoamine and a functionally-symmetric crosslinker to produce a partially crosslinked resin, wherein the partially crosslinked resin comprises secondary amines disposed on polyamidoamine backbones crosslinked by primary crosslinking moieties derived from the functionally-symmetric crosslinker; reacting the partially crosslinked resin and a first epihalohydrin to produce a crosslinked resin comprising the polyamidoamine backbones crosslinked by the primary crosslinking moieties and crosslinked by propanediyl crosslinking moieties derived from the first epihalohydrin, wherein the crosslinked resin has an azetidinium ratio of less than 0.1, and wherein the crosslinked resin has a pendent halohydrin ratio of less than 0.1; and reacting the crosslinked resin and a second epihalohydrin to produce a functionalized crosslinked resin comprising azetidinium moieties and pendent halohydrin moieties disposed on the polyamidoamine backbones crosslinked by the primary crosslinking moieties and the propanediyl crosslinking moieties, wherein the functionalized crosslinked resin has an azetidinium ratio of about 0.005 to about 0.12, and wherein the functionalized crosslinked resin has a pendent halohydrin ratio of about 0.01 to about 0.15.

17. The method according to paragraph 16, wherein the functionalized crosslinked resin has a pendent halohydrin to azetidinium ratio of about 3:1 to about 10:1.

18. The method according to paragraph 16 or 17, wherein the polyamidoamine comprises a reaction product of an organic diacid and a polyamine, wherein the organic diacid comprises adipic acid, dimethyl adipate, diethyl adipate, glutaric acid, dimethyl glutarate, diethyl glutarate, salts thereof, esters thereof, hydrates thereof, or any mixture thereof, and wherein the polyamine comprises diethylenetriamine, triethylenetetramine, tetraethylenepentamine, dimethylenetriamine, trimethylenetetramine, tetramethylenepentamine, salts thereof, or any mixture thereof.

19. The method according to any one of paragraphs 16-18, wherein the functionally-symmetric crosslinker comprises N,N'-methylenebisacrylamide (MBA), N,N'-methylenebismethacrylamide, poly(ethyleneglycol) diglycidyl ether, poly(propyleneglycol) diglycidyl ether, poly(ethyleneglycol) diacrylate, poly(propyleneglycol) diacrylate, polyazetidinium compounds, isomers thereof, salts thereof, or any mixture thereof.

20. A functionalized crosslinked resin produced by the method according to any one of paragraphs 1-19.

21. A functionalized crosslinked resin, comprising polyamidoamine backbones crosslinked by primary crosslinking moieties and propanediyl crosslinking moieties, wherein the primary crosslinking moieties are derived from a functionally-symmetric crosslinker; and azetidinium moieties and pendent halohydrin moieties disposed on the polyamidoamine backbones; wherein the functionalized crosslinked resin has an azetidinium ratio of about 0.005 to about 0.12, and wherein the functionalized crosslinked resin has a pendent halohydrin ratio of about 0.01 to about 0.15.

22. A creping adhesive comprising one or more of the functionalized crosslinked resins produced by the method according to any one of paragraphs 1-21.

23. A creping adhesive, comprising a crosslinked resin having the chemical formula (O), (P), or (Q), wherein $R^X$ is a crosslinking moiety, each $R^Y$ is independently a substituted or unsubstituted organic diyl moiety, and each $A^-$ is independently an anion.

24. A creping adhesive, comprising a crosslinked resin having the chemical formula (O), (P), or (Q), wherein: $R^X$ is a crosslinking moiety, each $R^Y$ is independently a substituted or unsubstituted organic diyl moiety, the creping adhesive has a cylinder probe adhesion of about 100 gram-force to about 300 gram-force, and the creping adhesive has a peel adhesion of about 20 g/cm to about 110 g/cm.

25. A creping adhesive, comprising: a functionalized crosslinked resin comprising azetidinium moieties and pendent halohydrin moieties disposed on polyamidoamine backbones, wherein: the polyamidoamine backbones are crosslinked by primary crosslinking moieties and propanediyl crosslinking moieties, the primary crosslinking moieties are derived from a functionally-symmetric crosslinker.

26. A creping adhesive, comprising: a functionalized crosslinked resin comprising azetidinium moieties and pendent halohydrin moieties disposed on polyamidoamine backbones, wherein: the polyamidoamine backbones are crosslinked by primary crosslinking moieties and propanediyl crosslinking moieties, the primary crosslinking moieties are derived from a functionally-symmetric crosslinker, and the creping adhesive has a cylinder probe adhesion of about 100 gram-force to about 300 gram-force.

27. A creping adhesive, comprising a functionalized crosslinked resin comprising azetidinium moieties and pendent halohydrin moieties disposed on polyamidoamine backbones, wherein: the polyamidoamine backbones are crosslinked by primary crosslinking moieties and propanediyl crosslinking moieties, the primary crosslinking moieties are derived from a functionally-symmetric crosslinker comprising a diacrylate compound, a bis(acrylamide) compound, a diepoxide compound, a polyazetidinium compound, N,N'-methylenebismethacrylamide, a poly(alkylene glycol) diglycidyl ether, a diisocyanate, a 1,3-dialkyldiazetidine-2,4-dione, a dianhydride, a diacyl halide, a dienone, a dialkyl halide, or any mixture thereof, and the creping adhesive at 15 wt % solids has a viscosity of about 10 cP to about 300 cP at a temperature of about 25° C.

28. A creping adhesive, comprising a functionalized crosslinked resin comprising azetidinium moieties and pendent halohydrin moieties disposed on polyamidoamine backbones, wherein: the polyamidoamine backbones are crosslinked by primary crosslinking moieties and propanediyl crosslinking moieties, the primary crosslinking moieties are derived from a functionally-symmetric crosslinker comprising a diacrylate compound, a bis(acrylamide) compound, a diepoxide compound, a polyazetidinium compound, N,N'-methylenebismethacrylamide, a poly(alkylene glycol) diglycidyl ether, a diisocyanate, a 1,3-dialkyldiazetidine-2,4-dione, a dianhydride, a diacyl halide, a dienone, a dialkyl halide, or any mixture thereof, the creping adhesive has a cylinder probe adhesion of about 100 gram-force to about 300 gram-force, the creping adhesive has a peel adhesion of about 20 g/cm to about 110 g/cm, and the creping adhesive at 15 wt % solids has a viscosity of about 10 cP to about 300 cP at a temperature of about 25° C.

29. The creping adhesive of any one of the paragraphs 22-28, wherein the crosslinking moiety $R^X$ is derived from N,N'-methylenebisacrylamide (MBA), N,N'-methylenebismethacrylamide (MBMA), poly(ethyleneglycol) diglycidyl ether (PEG-DGE), poly(propyleneglycol) diglycidyl ether (PPG-DGE), poly(ethyleneglycol) diacrylate (PEG-DA), poly(propyleneglycol) diacrylate (PPG-DA), polyazetidinium compounds, isomers thereof, salts thereof, or any mixture thereof.

30. The creping adhesive of any one of the paragraphs 22-29, wherein each of the substituted or unsubstituted organic diyl moiety $R^Y$ is independently methanediyl (—$CH_2$—), ethanediyl (—$CH_2CH_2$—), propanediyl (—$CH_2CH_2CH_2$—), butanediyl (—$CH_2(CH_2)_2CH_2$—), pentanediyl (—$CH_2(CH_2)_3CH_2$—), isomers thereof, halide-substituted derivatives thereof, or alkyl-substituted derivatives thereof.

31. The creping adhesive of any one of the paragraphs 22-30, wherein the crosslinking moiety $R^X$ is derived from N,N'-methylenebisacrylamide (MBA) or poly(propyleneglycol) diglycidyl ether (PPG-DGE).

32. The creping adhesive of any one of the paragraphs 22-31, wherein the crosslinking moiety $R^X$ is a —($CH_2CH_2C(O)NHCH_2NHC(O)CH_2CH_2$)— group or a —($CH_2CH(OH)CH_2O[CH_2CH(CH_3)O]CH_2CH(OH)CH_2$)— group.

33. The creping adhesive of any one of the paragraphs 22-32, wherein each of the substituted or unsubstituted organic diyl moiety $R^Y$ is independently propanediyl (—$CH_2CH_2CH_2$—) or butanediyl (—$CH_2(CH_2)_2CH_2$—).

34. The creping adhesive of any one of the paragraphs 22-33, wherein each of the substituted or unsubstituted organic diyl moiety $R^Y$ is independently a butanediyl moiety derived from adipic acid.

35. The creping adhesive of any one of the paragraphs 22-34, wherein the creping adhesive has a cylinder probe adhesion of about 200 gram-force to about 300 gram-force.

36. The creping adhesive of any one of the paragraphs 22-35, wherein the creping adhesive has a peel adhesion of about 50 g/cm to about 100 g/cm.

37. The creping adhesive of any one of the paragraphs 22-36, wherein the creping adhesive at 15 wt % solids has a viscosity of about 10 cP to about 300 cP at a temperature of about 25° C.

38. The creping adhesive of any one of the paragraphs 22-37, wherein the crosslinked resin is a functionalized crosslinked resin with an azetidinium ratio of about 0.005 to about 0.12.

39. The creping adhesive of any one of the paragraphs 22-38, wherein the functionalized crosslinked resin has a pendent halohydrin ratio of about 0.01 to about 0.15.

40. The creping adhesive of any one of the paragraphs 22-39, wherein the functionalized crosslinked resin has a pendent halohydrin to azetidinium ratio of about 3:1 to about 10:1.

41. The creping adhesive of any one of the paragraphs 22-40, wherein the functionalized crosslinked resin has the chemical formula (Q), wherein: $R^X$ is a crosslinking moiety and $R^Y$ is a substituted or unsubstituted organic diyl moiety.

42. The creping adhesive of any one of the paragraphs 22-41, wherein the acidified crosslinked resin has the chemical formula (O), and wherein each anion $A^-$ is independently fluoride, chloride, bromide, iodide, bisulfate, sulfate, bisulfite, sulfite, hydrogenphosphite, phosphite, phosphate, acetate, formate, citrate, ascorbate, oxalate, borate, salts thereof, or isomers thereof.

43. The creping adhesive of any one of the paragraphs 22-42, wherein the creping adhesive has a peel adhesion of about 50 g/cm to about 150 g/cm.

44. The creping adhesive of any one of the paragraphs 22-43, wherein the acidified crosslinked resin has the chemical formula (O) and has a pH of about 2 to about 8.

45. The creping adhesive of any one of the paragraphs 22-43, wherein the acidified crosslinked resin has the chemical formula (O) and has a pH of about 2 to less than 8.

46. The creping adhesive of any one of the paragraphs 22-43, wherein the acidified crosslinked resin has the chemical formula (O) and has a pH of about 2 to less than 7.

47. The creping adhesive of any one of the paragraphs 22-43, wherein the acidified crosslinked resin has the chemical formula (O) and has a pH of about 2 to about 5.

48. A creping adhesive, comprising a crosslinked resin having the chemical formula:

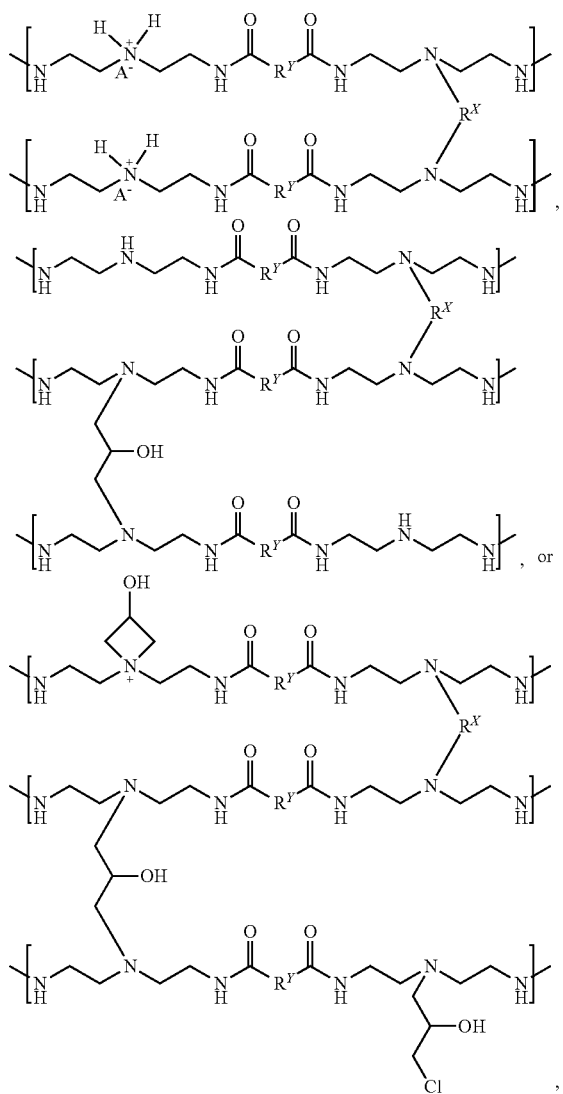

wherein: $R^X$ is a crosslinking moiety, each $R^Y$ is independently a substituted or unsubstituted organic diyl moiety, and each $A^-$ is independently an anion.

49. The creping adhesive according to paragraph 48, wherein the creping adhesive has a cylinder probe adhesion of about 100 gram-force to about 300 gram-force.

50. The creping adhesive according to paragraph 48 or 49, wherein the creping adhesive has a peel adhesion of about 20 g/cm to about 110 g/cm.

51. The creping adhesive according to any one of paragraphs 48 to 50, wherein the creping adhesive has a cylinder probe adhesion of about 200 gram-force to about 300 gram-force.

52. The creping adhesive according to any one of paragraphs 48 to 549, where the creping adhesive has a peel adhesion of about 50 g/cm to about 100 g/cm.

53. The creping adhesive according to any one of paragraphs 48 to 52, wherein the crosslinking moiety $R^X$ is derived from a compound selected from the group consisting of: a diacrylate, a bis(acrylamide), a bis(methacrylamide), a diepoxide, a polyazetidinium compound, a diisocyanate, a 1,3-dialkyldiazetidine-2,4-dione, a dianhydride, a diacyl halide, a dienone, a dialkyl halide, and a dialdehyde, and wherein each substituted or unsubstituted organic diyl moiety $R^Y$ is independently selected from the group consisting of: methanediyl, ethanediyl, propanediyl, butanediyl, pentanediyl, isomers thereof, halide-substituted derivatives thereof, and alkyl-substituted derivatives thereof.

54. The creping adhesive according to any one of paragraphs 48 to 53, wherein the crosslinking moiety $R^X$ is derived from N,N'-methylenebisacrylamide, N,N'-methylenebismethacrylamide, poly(ethyleneglycol) diglycidyl ether, poly(propyleneglycol) diglycidyl ether, poly(ethyleneglycol) diacrylate, poly(propyleneglycol) diacrylate, a polyazetidinium compound, isomers thereof, salts thereof, or any mixture thereof, and wherein each substituted or unsubstituted organic diyl moiety $R^Y$ is independently methanediyl, ethanediyl, propanediyl, butanediyl, pentanediyl, isomers thereof, halide-substituted derivatives thereof, or alkyl-substituted derivatives thereof.

55. The creping adhesive according to any one of paragraphs 48 to 54, wherein the crosslinking moiety $R^X$ is derived from N,N'-methylenebisacrylamide or poly(propyleneglycol) diglycidyl ether, and wherein each substituted or unsubstituted organic diyl moiety $R^Y$ is independently propanediyl or butanediyl.

56. The creping adhesive according to any one of paragraphs 48 to 55, wherein the creping adhesive at 15 wt % solids has a viscosity of about 10 cP to about 300 cP at a temperature of about 25° C.

57. The creping adhesive according to any one of paragraphs 48 to 56, wherein the crosslinked resin is a functionalized crosslinked resin with an azetidinium ratio of about 0.005 to about 0.12.

58. The creping adhesive according to any one of paragraphs 48 to 57, wherein the functionalized crosslinked resin has a pendent halohydrin ratio of about 0.01 to about 0.15.

59. The creping adhesive according to any one of paragraphs 48 to 58, wherein the functionalized crosslinked resin has a pendent halohydrin to azetidinium ratio of about 3:1 to about 10:1.

60. The creping adhesive according to paragraph 48, wherein the crosslinked resin has the chemical formula:

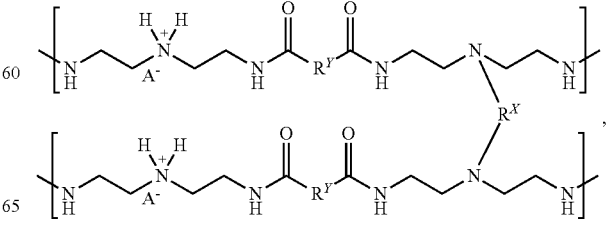

wherein each A⁻ is independently fluoride, chloride, bromide, iodide, bisulfate, sulfate, bisulfite, sulfite, hydrogenphosphite, phosphite, phosphate, acetate, formate, citrate, ascorbate, oxalate, borate, salts thereof, or isomers thereof.

61. The creping adhesive according to paragraph 48 or 60, wherein the creping adhesive has a peel adhesion of about 50 g/cm to about 150 g/cm.

62. The creping adhesive according to paragraph 60 or 61, wherein the crosslinking moiety $R^X$ is derived from a compound selected from the group consisting of: a diacrylate, a bis(acrylamide), a bis(methacrylamide), a diepoxide, a polyazetidinium compound, a diisocyanate, a 1,3-dialkyldiazetidine-2,4-dione, a dianhydride, a diacyl halide, a dienone, a dialkyl halide, and a dialdehyde, and wherein each substituted or unsubstituted organic diyl moiety $R^Y$ is independently selected from the group consisting of: methanediyl, ethanediyl, propanediyl, butanediyl, pentanediyl, isomers thereof, halide-substituted derivatives thereof, and alkyl-substituted derivatives thereof.

63. A creping adhesive, comprising: a functionalized crosslinked resin comprising azetidinium moieties and pendent halohydrin moieties disposed on polyamidoamine backbones, wherein: the polyamidoamine backbones are crosslinked by primary crosslinking moieties and propanediyl crosslinking moieties, and the primary crosslinking moieties are derived from a functionally-symmetric crosslinker.

64. The creping adhesive according to paragraph 63, wherein the creping adhesive has a cylinder probe adhesion of about 100 gram-force to about 300 gram-force.

65. The creping adhesive according to paragraph 63 or 64, wherein the creping adhesive has a peel adhesion of about 50 g/cm to about 100 g/cm.

66. The creping adhesive according to any one of paragraphs 63 to 65, wherein the functionally-symmetric crosslinker comprises N,N'-methylenebisacrylamide, N,N'-methylenebismethacrylamide, poly(ethyleneglycol) diglycidyl ether, poly(propyleneglycol) diglycidyl ether, poly(ethyleneglycol) diacrylate, poly(propyleneglycol) diacrylate, polyazetidinium compounds, isomers thereof, salts thereof, or any mixture thereof.

67. The creping adhesive according to any one of paragraphs 63 to 66, wherein the functionalized crosslinked resin has an azetidinium ratio of about 0.005 to about 0.12.

68. The creping adhesive according to any one of paragraphs 63 to 67, wherein the functionalized crosslinked resin has a pendent halohydrin ratio of about 0.01 to about 0.15.

69. The creping adhesive according to any one of paragraphs 63 to 68, wherein the functionalized crosslinked resin has a pendent halohydrin to azetidinium ratio of about 3:1 to about 10:1.

70. A creping adhesive, comprising: a functionalized crosslinked resin comprising azetidinium moieties and pendent halohydrin moieties disposed on polyamidoamine backbones, wherein: the polyamidoamine backbones are crosslinked by primary crosslinking moieties and propanediyl crosslinking moieties, the primary crosslinking moieties are derived from a functionally-symmetric crosslinker comprising a diacrylate compound, a bis(acrylamide) compound, a bis(methacrylamide) compound, a diepoxide compound, a polyazetidinium compound, a diisocyanate compound, a 1,3-dialkyldiazetidine-2,4-dione compound, a dianhydride compound, a diacyl halide compound, a dienone compound, a dialkyl halide compound, a dialdehyde compound, or any mixture thereof, the propanediyl crosslinking moieties are derived from epichlorohydrin, epibromohydrin, epiiodohydrin, or any mixture thereof, the creping adhesive has a cylinder probe adhesion of about 100 gram-force to about 300 gram-force, the creping adhesive has a peel adhesion of about 20 g/cm to about 110 g/cm, and the creping adhesive at 15 wt % solids has a viscosity of about 10 cP to about 300 cP at a temperature of about 25° C.

71. The creping adhesive according to paragraph 70, wherein the primary crosslinking moieties are derived from N,N'-methylenebisacrylamide, N,N'-methylenebismethacrylamide, poly(ethyleneglycol) diglycidyl ether, poly(propyleneglycol) diglycidyl ether, poly(ethyleneglycol) diacrylate, poly(propyleneglycol) diacrylate, polyazetidinium compounds, isomers thereof, salts thereof, or any mixture thereof, and wherein the propanediyl crosslinking moieties are derived from epichlorohydrin.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. And if applicable, all patents, test procedures, and other documents cited in this application are fully incorporated by reference to the extent such disclosure is not inconsistent with this application and for all jurisdictions in which such incorporation is permitted.

While the foregoing is directed to certain illustrative embodiments, other and further embodiments of the invention can be devised without departing from the basic scope thereof, and the scope thereof is determined by the claims that follow.

What is claimed is:

1. A creping adhesive, comprising:
    a functionalized crosslinked resin comprising azetidinium moieties and pendent halohydrin moieties disposed on polyamidoamine backbones, wherein:
        the polyamidoamine backbones are crosslinked by primary crosslinking moieties and propanediyl crosslinking moieties,
        the primary crosslinking moieties are derived from a functionally-symmetric crosslinker, and
        the functionalized crosslinked resin has an azetidinium ratio of 0.3 or less.

2. The creping adhesive of claim 1, wherein the creping adhesive has a cylinder probe adhesion of about 100 gram-force to about 300 gram-force.

3. The creping adhesive of claim 1, wherein the creping adhesive has a peel adhesion of about 50 g/cm to about 100 g/cm.

4. The creping adhesive of claim 1, wherein the functionally-symmetric crosslinker comprises N,N'-methylenebisacrylamide, N,N'-methylenebismethacrylamide, poly(ethyleneglycol) diglycidyl ether, poly(propyleneglycol) diglycidyl ether, poly(ethyleneglycol) diacrylate, poly(propyleneglycol) diacrylate, polyazetidinium compounds, isomers thereof, salts thereof, or any mixture thereof.

5. The creping adhesive of claim 1, wherein the functionally-symmetric crosslinker comprises a diacrylate compound, a bis(acrylamide) compound, a bis(methacrylamide) compound, a diepoxide compound, a polyazetidinium compound, a diisocyanate compound, a 1,3-dialkyldiazetidine-2,4-dione compound, a dianhydride compound, a diacyl halide compound, a dienone compound, a dialkyl halide compound, a dialdehyde compound, or any mixture thereof, and wherein the propanediyl crosslinking moieties are derived from epichlorohydrin, epibromohydrin, epiiodohydrin, or any mixture thereof.

6. The creping adhesive of claim 1, wherein the functionally-symmetric crosslinker comprises a diacrylate, a bis(acrylamide), a bis(methacrylamide), a diepoxide, a 1,3-dialkyldiazetidine-2,4-dione, a dienone, or any mixture thereof.

7. The creping adhesive of claim 1, wherein the functionally symmetric crosslinker comprises N,N'-methylenebisacrylamide, N,N'-methylenebismethacrylamide, poly(ethyleneglycol) diglycidyl ether, poly(propyleneglycol) diglycidyl ether, poly(ethyleneglycol) diacrylate, poly(propyleneglycol) diacrylate, a polyazetidinium compound, isomers thereof, salts thereof, or any mixture thereof.

8. The creping adhesive of claim 1, wherein the functionally symmetric crosslinker comprises N,N'-methylenebisacrylamide or poly(propyleneglycol) diglycidyl ether.

9. The creping adhesive of claim 1, wherein the functionalized crosslinked resin has a pendent halohydrin ratio of about 0.005 to about 0.2.

10. The creping adhesive of claim 9, wherein the functionalized crosslinked resin has a pendent halohydrin to azetidinium ratio of about 3:1 to about 10:1.

11. The creping adhesive of claim 1, wherein:
the functionally symmetric crosslinker comprises N,N'-methylenebisacrylamide or poly(propyleneglycol) diglycidyl ether,
the functionalized crosslinked resin has a pendent halohydrin ratio of about 0.0005 to about 0.25, and
the functionalized crosslinked resin has a pendent halohydrin to azetidinium ratio of about 3:1 to about 10:1.

12. A creping adhesive, comprising:
water; and
a functionalized crosslinked resin comprising azetidinium moieties and pendent halohydrin moieties disposed on polyamidoamine backbones, wherein:
the polyamidoamine backbones are crosslinked by primary crosslinking moieties and propanediyl crosslinking moieties,
the primary crosslinking moieties are derived from a functionally-symmetric crosslinker, and
the functionalized crosslinked resin has an azetidinium ratio of 0.3 or less.

13. The creping adhesive of claim 12, wherein the functionally symmetric crosslinker comprises N,N'-methylenebisacrylamide, N,N'-methylenebismethacrylamide, poly(ethyleneglycol) diglycidyl ether, poly(propyleneglycol) diglycidyl ether, poly(ethyleneglycol) diacrylate, poly(propyleneglycol) diacrylate, polyazetidinium compounds, isomers thereof, salts thereof, or any mixture thereof, and wherein the propanediyl crosslinking moieties are derived from epichlorohydrin.

14. The creping adhesive of claim 12, wherein the creping adhesive at 15 wt % of solids has a viscosity of about 10 cP to about 300 cP at a temperature of about 25° C.

15. The creping adhesive of claim 12, wherein the creping adhesive has a solids content of about 10 wt % to about 50 wt %.

16. The creping adhesive of claim 12, wherein the functionally symmetric crosslinker comprises a diacrylate compound, a bis(acrylamide) compound, a bis(methacrylamide) compound, a diepoxide compound, a polyazetidinium compound, a diisocyanate compound, a 1,3-dialkyldiazetidine-2,4-dione compound, a dianhydride compound, a diacyl halide compound, a dienone compound, a dialkyl halide compound, a dialdehyde compound, or any mixture thereof, and wherein the propanediyl crosslinking moieties are derived from epichlorohydrin, epibromohydrin, epiiodohydrin, or any mixture thereof.

17. The creping adhesive of claim 12, wherein the azetidinium ratio is about 0.0005 to 0.3, and wherein the functionalized crosslinked resin has a pendent halohydrin ratio of about 0.001 to about 0.5.

18. The creping adhesive of claim 17, wherein the functionalized crosslinked resin has a pendent halohydrin to azetidinium ratio of about 1:1 to about 20:1.

19. A creping adhesive, comprising:
a functionalized crosslinked resin comprising azetidinium moieties and pendent halohydrin moieties disposed on polyamidoamine backbones, wherein:
the polyamidoamine backbones are crosslinked by primary crosslinking moieties and propanediyl crosslinking moieties,
the primary crosslinking moieties are derived from a functionally-symmetric crosslinker,
the functionalized crosslinked resin has an azetidinium ratio of about 0.005 to about 0.12, and
the functionalized crosslinked resin has a pendent halohydrin ratio of about 0.01 to about 0.15.

20. The creping adhesive of claim 19, wherein the functionalized crosslinked resin has a pendent halohydrin to azetidinium ratio of about 3:1 to about 10:1.

* * * * *